United States Patent
Teng et al.

(10) Patent No.: US 12,433,974 B2
(45) Date of Patent: Oct. 7, 2025

(54) BREAST PUMP SYSTEMS AND METHODS

(71) Applicant: WILLOW INNOVATIONS, INC., Mountain View, CA (US)

(72) Inventors: Jenny Teng, Belmont, CA (US); Jason Chamberlain, Campbell, CA (US); Becky Scanlon, Los Altos Hills, CA (US); Elizabeth Ho, Milpitas, CA (US); Marvin Patel, Aptos, CA (US); John Chang, Los Altos, CA (US); Jens Kuehner-Laguerre, Sunnyvale, CA (US)

(73) Assignee: Willow Innovations, Inc., Mountain View, CA (US)

(*) Notice: Subject to any disclaimer, the term of this patent is extended or adjusted under 35 U.S.C. 154(b) by 0 days.

(21) Appl. No.: 18/080,860

(22) Filed: Dec. 14, 2022

(65) Prior Publication Data

US 2023/0110029 A1    Apr. 13, 2023

Related U.S. Application Data

(63) Continuation of application No. PCT/US2021/062241, filed on Dec. 7, 2021.

(60) Provisional application No. 63/234,764, filed on Aug. 19, 2021, provisional application No. 63/199,086, filed on Dec. 7, 2020.

(51) Int. Cl.
*A61M 1/06*    (2006.01)
(52) U.S. Cl.
CPC ........ *A61M 1/067* (2021.05); *A61M 1/06935* (2021.05); *A61M 1/0697* (2021.05)

(58) Field of Classification Search
CPC ........ A61M 1/06; A61M 1/062; A61M 1/064; A61M 1/066; A61M 1/068; A61M 1/007; A61M 2210/1007; A61M 1/067; A61M 1/0697; A61M 1/069; A61M 1/0693; A61M 1/06935; A61B 2018/00333; A61J 13/00
See application file for complete search history.

(56) References Cited

U.S. PATENT DOCUMENTS

| | | |
|---|---|---|
| 1,197,011 A | 9/1916 | Cilino |
| 4,263,912 A | 4/1981 | Adams |
| 4,311,141 A | 1/1982 | Diamond |
| 4,768,547 A | 9/1988 | Danby et al. |
| 4,821,580 A | 4/1989 | Jomitsma |
| 5,514,166 A | 5/1996 | Silver et al. |

(Continued)

FOREIGN PATENT DOCUMENTS

| CN | 2628060 Y | 7/2004 |
|---|---|---|
| CN | 201692384 | 1/2011 |

(Continued)

OTHER PUBLICATIONS

Chiu et al., Development of a piezoelectric polyvinylidene fluoride (PVDF) polymer-based sensor patch for simultaneous heartbeat and respiration monitoring, Sensors and Actuators A: Physical, vol. 189, Jan. 2013, pp. 328-334.

(Continued)

*Primary Examiner* — Kevin C Sirmons
*Assistant Examiner* — William R Frehe

(57) ABSTRACT

Systems and methods for pumping milk from a breast, wherein the milk is expressed from the breast under suction and milk is expulsed from the pumping mechanism to a collection container.

6 Claims, 25 Drawing Sheets

(56) References Cited

U.S. PATENT DOCUMENTS

| | | |
|---|---|---|
| 5,542,921 A | 8/1996 | Meyers et al. |
| 5,634,468 A | 6/1997 | Platt et al. |
| 5,658,133 A | 8/1997 | Anderson et al. |
| 5,810,772 A | 9/1998 | Niederberger |
| 5,827,191 A | 10/1998 | Rosenfeld |
| 6,273,868 B1 | 8/2001 | Nordvik |
| 6,287,252 B1 | 9/2001 | Lugo |
| 6,328,082 B1 | 12/2001 | Lafond |
| D459,233 S | 6/2002 | Young |
| 6,440,100 B1 | 8/2002 | Prentiss |
| 6,547,756 B1 | 4/2003 | Greter et al. |
| 6,579,258 B1 | 6/2003 | Atkin et al. |
| 6,712,785 B2 | 3/2004 | Morton et al. |
| 6,840,918 B1 | 1/2005 | Britto et al. |
| 7,201,735 B2 | 4/2007 | Atkin et al. |
| 7,223,255 B2 | 5/2007 | Myers et al. |
| 7,621,797 B1 | 11/2009 | Hershkovich |
| 7,824,363 B2 | 11/2010 | Myers |
| 7,972,297 B2 | 7/2011 | Bryan et al. |
| 7,988,661 B2 | 8/2011 | Silver et al. |
| 8,057,425 B1 | 11/2011 | Myers et al. |
| 8,070,715 B2 | 12/2011 | Quackenbush et al. |
| 8,070,716 B2 | 12/2011 | Sutrina et al. |
| 8,262,606 B2 | 9/2012 | Greter et al. |
| 8,282,596 B2 | 10/2012 | Greter et al. |
| 8,353,865 B2 | 1/2013 | Thilwind et al. |
| 8,357,116 B2 | 1/2013 | Simdon |
| 8,376,986 B2 | 2/2013 | Van Schijndel et al. |
| 8,671,701 B2 | 3/2014 | McKendry |
| 8,684,961 B2 | 4/2014 | Gottenbos et al. |
| 8,801,495 B1 | 8/2014 | Guindon |
| 9,050,404 B2 | 6/2015 | Silver et al. |
| 9,162,016 B2 | 10/2015 | Geddes |
| 9,173,587 B2 | 11/2015 | Van Schijndel et al. |
| 9,199,017 B2 | 12/2015 | Greter |
| 9,278,167 B2 | 3/2016 | Aalders et al. |
| 10,105,474 B2 | 10/2018 | Barral et al. |
| 10,625,005 B2 | 4/2020 | Chang et al. |
| 10,881,766 B2 | 1/2021 | O'Toole et al. |
| 2003/0191433 A1 | 10/2003 | Prentiss |
| 2004/0024351 A1 | 2/2004 | Greter et al. |
| 2004/0101414 A1 | 5/2004 | Gharib et al. |
| 2004/0127845 A1 | 7/2004 | Renz et al. |
| 2005/0059928 A1 | 3/2005 | Larsson |
| 2005/0131332 A1 | 6/2005 | Kelly et al. |
| 2005/0234370 A1 | 10/2005 | Beal et al. |
| 2006/0106334 A1 | 5/2006 | Jordan et al. |
| 2008/0045888 A1 | 2/2008 | Edwards et al. |
| 2008/0177224 A1 | 7/2008 | Kelly et al. |
| 2008/0243059 A1 | 10/2008 | Yamashita et al. |
| 2008/0255503 A1* | 10/2008 | Quackenbush .......... A61M 1/06 |
| | | 604/74 |
| 2009/0024080 A1 | 1/2009 | Rohrig |
| 2010/0010682 A1 | 1/2010 | Cardinal et al. |
| 2010/0106082 A1 | 4/2010 | Zhou |
| 2010/0121267 A1* | 5/2010 | Silver .................. A61M 1/0697 |
| | | 604/74 |
| 2010/0217148 A1 | 8/2010 | Binder |
| 2011/0071466 A1 | 3/2011 | Silver et al. |
| 2011/0196291 A1 | 8/2011 | Vischer et al. |
| 2011/0245763 A1 | 10/2011 | Myers |
| 2011/0270162 A1 | 11/2011 | Guo |
| 2012/0101575 A1 | 4/2012 | Horne et al. |
| 2012/0277636 A1 | 11/2012 | Blondheim et al. |
| 2012/0277728 A1 | 11/2012 | Weber et al. |
| 2013/0023821 A1* | 1/2013 | Khalil ..................... A61M 1/06 |
| | | 604/74 |
| 2013/0123688 A1 | 5/2013 | Bosman et al. |
| 2013/0131588 A1 | 5/2013 | Silver et al. |
| 2013/0177455 A1 | 7/2013 | Kamen et al. |
| 2013/0294882 A1 | 11/2013 | Christy et al. |
| 2014/0066734 A1 | 3/2014 | Zdeblick |
| 2014/0323962 A1 | 10/2014 | Kooijker et al. |
| 2014/0330200 A1 | 11/2014 | Scheidegger et al. |
| 2014/0378895 A1 | 12/2014 | Barack |
| 2014/0378946 A1 | 12/2014 | Thompson et al. |
| 2015/0065994 A1 | 3/2015 | Fridman et al. |
| 2015/0100016 A1 | 4/2015 | Liao |
| 2015/0148709 A1 | 5/2015 | Mardiks et al. |
| 2015/0196247 A1 | 7/2015 | Lau |
| 2015/0283311 A1 | 10/2015 | Alvarez et al. |
| 2015/0292500 A1 | 10/2015 | Girard et al. |
| 2016/0015876 A1 | 1/2016 | Tattersfield et al. |
| 2016/0082165 A1 | 3/2016 | Alvarez et al. |
| 2016/0256618 A1 | 9/2016 | Embleton |
| 2016/0287769 A1 | 10/2016 | Makower et al. |
| 2017/0072118 A1 | 3/2017 | Makower et al. |
| 2017/0080134 A1 | 3/2017 | Makower et al. |
| 2017/0173232 A1 | 6/2017 | Chang et al. |
| 2017/0182231 A1 | 6/2017 | Aalders et al. |
| 2018/0339089 A1 | 11/2018 | Chang et al. |
| 2020/0397960 A1 | 12/2020 | Joyner et al. |
| 2023/0111110 A1* | 4/2023 | De Becdelievre ...... A61M 1/60 |
| | | 604/74 |

FOREIGN PATENT DOCUMENTS

| | | |
|---|---|---|
| GB | 2342446 A | 4/2000 |
| JP | 2005279044 | 10/2005 |
| RU | 2012 107356 | 5/2012 |
| WO | WO 2000/57934 | 10/2000 |
| WO | WO2001054488 | 8/2001 |
| WO | WO2011144984 A | 11/2011 |
| WO | WO2012037848 | 3/2012 |
| WO | WO 2013/187763 | 12/2013 |
| WO | WO2013184004 | 12/2013 |
| WO | WO2018006630 | 1/2018 |

OTHER PUBLICATIONS

Double Electric Breast Pump/Dr. Brown's, http://www.drbrownsbaby.com/breastfeeding-product/breast-pumps/double-electric, May 15, 2014.

* cited by examiner

BREAST PUMP SYSTEMS AND METHODS

FIELD OF THE DISCLOSURE

The present disclosure generally relates to portable breast pump systems and methods for collecting milk from a breast of a nursing mother.

BACKGROUND OF THE DISCLOSURE

As more women become aware that breastfeeding is the best source of nutrition for a baby, and also offers health benefits to the nursing mother, the need is increasing for breast pump solutions that are user-friendly, quiet, discrete and versatile for use by a nursing mother in various situations. This is particularly true for the working mother, who is away from the home for eight to ten hours or more and needs to pump breast milk in order to have it available for her baby, but it is also a requirement for many other situations where the mother is away from the privacy of the home for an extended period, such as during shopping, going out to dinner or other activities.

Although a variety of breast pumps are available, a number are awkward and cumbersome, requiring many parts and assemblies and being difficult to transport. Hand pump varieties that are manually driven are onerous to use and can be inconvenient to use. Some powered breast pumps require an AC power source to plug into during use. Some systems are battery driven, but draw down the battery power fairly rapidly as the motorized pump continuously operates to maintain suction during the milk extraction process. Many of the breast pumps available are clearly visible to an observer when the mother is using it, and many also expose the breast of the mother during use.

There is a continuing need for a small, portable, self-powered, energy efficient, wearable breast pump system that is easy to use, that mimics natural nursing, and is discrete by not exposing the breast of the user and nearly unnoticeable when worn.

To ensure effective pumping, a peristaltic approach can be desirable for a number of reasons including avoiding contamination due to there being no contact with the pumped fluids. Moreover, peristaltic pumps are generally low maintenance due to the lack of valves and seals and predictably controllable since a fixed amounts of fluids are pumped during operation and backflow is minimized. Various reusable containers can be employed to accept fluids pumped by such systems and a pressure sensor configured remote from pumped fluids can be provided to measure pressure at the breast.

It can alternatively or additionally be desirable to provide a breast pump system including a volume equalization and diffusing chamber, the volume equalization and diffusing chamber defined by the lid and flange and a milk collection container assembly configured to receive pumped milk. A diaphragm can be provided to function to create a vacuum within a first chamber and the volume equalization and diffusing chamber conditions the vacuum being applied within the nipple tunnel.

Moreover, it can alternatively or additionally be desirable to provide a user with the ability to collect milk within a bra by connecting a conventional pump to in-bra structure. This approach can involve providing a breast pump adapter assembly that converts or is embodied in a breast pump subassembly that cooperates with one or more conventional breast pumps configured to reside outside of the bra.

There is thus a continuing need for a breast pump system that is effective and convenient to use that embodies such features. The present disclosure addresses these and other needs.

SUMMARY OF THE DISCLOSURE

Briefly and in general terms, the present disclosure is directed toward breast pump systems or methods. The system includes breast contacting structure and a reusable collection or storage container or assembly, and peristaltic pumping structure that delivers milk from a breast to the collection assembly. The method involves pumping milk from a breast and delivering the pumped milk into the collection assembly or storage container. In one particular aspect, the breast pump system includes a peristaltic pump contained within the breast pump housing sized and configured to be received within a user's bra.

According to one aspect of the present disclosure, a system for pumping milk from a breast includes one or more of: a skin contact member or flange configured to form a seal with the breast; a sensor for determining the pressure at the breast; a conduit or tube in fluid communication with and connected to the skin contact member; a peristaltic driving mechanism configured to establish a vacuum profile within the conduit; an external shell; a reusable milk collection container; and a non-transitory computer readable medium having stored thereon instructions executable by a computing device to cause the computing devices to perform functions associated with and directed by the instructions; wherein the external shell comprises a compartment; wherein the skin contact member, the conduit and the driving mechanism are received in the compartment of the external shell; wherein the milk collection container and the shell are shaped and configured to be contoured to the breast of a user.

In various of the disclosed embodiments, the system defines a breast profile. The natural breast profile is contemplated to fit comfortably and conveniently into a bra of a user and to present a natural look. As such, the profile is characterized by having a non-circular base. Moreover, like natural breasts, the profile of the device or system is contemplated to define one or more asymmetric curves and off-center inertial centers. The breast engaging portion or flange embodies structure that curves and wraps back and around the pump in a direction away from the breast to thereby present comfortable, soft and round surfaces to the breast. In one aspect, the system defines a breast enhancement system for enlarging the appearance of the user's breast.

In at least one embodiment, the system functions by operating a control system that tracks internal pressure of the system against a known waveform. In this regard, the waveform can be a vacuum waveform indicative of pressures applied to a breast, and can define a sine wave fluctuating between about 60 mmHg of vacuum to a vacuum from about 120 mmHg to about 250 mmHg, or other desirable or useful waveform.

In one or more embodiments, the system includes a controller that accomplishes real time pressure control inside the system.

In one or more embodiments, the system includes a controller providing automated compliance sensing and response.

In one or more embodiments, the system includes a non-contact pressure sensing arrangement that does not touch the skin or the milk inside the tube while accurately determining internal pressure of the tube.

In one or more embodiments, the system includes one or more controllers that automatically detects one or more of letdown, overfill and flow.

In one or more embodiments, the system can be adapted to visualize a user's data and trends as it relates to volume (from each breast and total), and number of sessions on several dimensions (per day, per week and per month). Data and analytics can also be provided on pumping session.

In at least one embodiment, the flange or skin contact member, the conduit, the driving mechanism, the external shell and the milk collection container are all contained within a cup of a brassiere.

In at least one embodiment, the system is battery powered, the system comprising a battery, wherein the battery is received in the compartment of the external shell.

In at least one embodiment, the milk collection container comprises a one-way valve that permits milk inflow into the milk collection container but prevents milk backflow from the milk collection container to the conduit. In one embodiment, the collection container or container assembly includes an extra part, valve or fitment that is attached thereto and facilitates creating a seal with the container to establish a closed system. Moreover, in one or more embodiments, the container is reusable and can be removed from the breast pump system. Various container approaches can include one or more of a pouring spout, a hinged and/or removable lid and a removable or otherwise incorporated liner.

According to another aspect of the present disclosure, a system for pumping milk from a breast includes one or more of: a flange or skin contact member configured to form a seal with the breast; a conduit in fluid communication with and connected to the skin contact member; a peristaltic driving mechanism configured to establish a vacuum profile within the conduit by cyclically compressing and allowing decompression of a portion of the conduit; and an external shell containing the conduit and the driving mechanism and supporting the skin contact member.

In at least one embodiment, the system further includes a milk collection container, wherein the milk collection container is in fluid communication with the conduit. In one or more aspects, the container is reusable and can include a reusable or hinged lid as well as a removable or otherwise incorporated liner.

In at least one embodiment, the breast pumps system includes a pressure sensor that senses the pressure at the breast. The sensor is a non-contact sensor in that it is not in direct contact with one or more of the breast or the fluids pumped by the breast pump system.

In at least one embodiment, the skin contact member includes: a breast contact portion configured and dimensioned to fit over and form a seal with a portion of the breast; and a nipple receiving portion extending from the breast contact portion.

Further in a specific embodiment there is provided a breast pump and brassiere assembly including one or more of a brassiere assembly and a breast pump assembly including a plurality of components, wherein selected components of the breast pump assembly are retained within and spaced apart within the brassiere assembly.

According to another aspect of the present disclosure, a method of operating a system for pumping milk includes one or more of: providing the system comprising a skin contact member configured to form a seal with the breast, a conduit in fluid communication with and connected to the skin contact member; a peristaltic driving mechanism including roller compression members configured to compress and allow decompression of the conduit in response to cyclical movements of the roller compression member, a non-contact pressure sensor, and a controller configured to control operation of the driving mechanism; sealing the skin contact member to the breast; operating the peristaltic driving mechanism to generate predetermined pressure cycles within the conduit; monitoring by the controller of at least one of position and speed of movement of the roller compression members relative to the conduit; measuring or calculating pressure within the conduit; maintaining or modifying motion of the roller compression members as needed, based upon feedback from the calculated pressure and at least one of force, position and speed of movement of the roller compression members, to ensure that the predetermined pressure cycles continue to be generated.

In at least one embodiment, the predetermined pressure cycles comprise extraction pressure cycles, and the controller modifies the motion of the roller compression members relative to an amount of milk entering the conduit, to maintain predetermined pressures during the extraction pressure cycles.

In at least one embodiment, the predetermined pressure cycles comprise latch cycles, wherein upon determination that milk has entered the conduit or after a predetermined period of time, the controller operates the roller compression members to achieve predetermined extraction pressure cycles, wherein the predetermined extraction cycles differ from the predetermined latch cycles by at least one of maximum suction level, cycle frequency or waveform shape. Latch can be created within a nipple receiving portion of a flange or at the engagement between the breast and the flange proximal of the nipple receiving portion. Moreover, in one or more embodiments, the system includes structure or functions to recognize when a user is done pumping, or includes structure or functions such that when there is a loss of vacuum recognition which allows the user to easily end a pumping session by simply pausing and pulling the device off of the breast.

In one or more embodiments, the system provides a variance in vacuum waveforms as needed, selected and/or directed by a system controller. In one aspect, such variance in waveforms accomplish controlling latch vacuums such that a user directly or through an app or the system automatically alternates between latching and not latching, or a level or degree of latch can be varied during a pumping session. Latch can be varied from for example 60 mmHg for a number of cycles and then that latch can vary and that latch can be reduced to zero or slightly positive or otherwise mimic suckling patterns of a child, be responsive levels of mobility, or comfort needs generally or due to cracked or sore nipples or other health needs. One objective can be to provide the user with a more natural feeling the same facilitating a breast to reach let down and/or express more milk over a pumping session.

According to another aspect of the present disclosure, a system for pumping milk includes one or more of: a flange or skin contact member configured to form a seal with a breast; a conduit in fluid communication with and connected to the skin contact member; a peristaltic driving mechanism including roller compression members configured to compress and allow decompression of the conduit in response to movements of the roller compression members; a sensor; and a controller configured to control operation of the driving mechanism; wherein upon sealing the skin contact member to the breast, the controller operates the driving mechanism to generate predetermined pressure cycles within the conduit, monitors at least one of position and speed of movement of the roller compression members relative to the conduit, measures or calculates pressure within the conduit based upon signals received from the sensor, and maintains or modifies motion of the roller compression members as needed, based upon feedback from the calculated pressure and at least one of force, position and speed of movement of the roller compression members, to ensure that the predetermined pressure cycles continue to be generated.

In one particular embodiment, the breast pump system includes one or more of a flange configured and dimensioned to form a seal with the breast, the flange including a nipple tunnel, a lid sized and shaped to receive the flange, a diaphragm, a first chamber, the first chamber defined by the lid and diaphragm, a pump assembly configured to flex the diaphragm and create a vacuum within the first chamber, a volume equalization and diffusing chamber, the volume equalization and diffusing chamber defined by the lid and flange and a milk collection container assembly configured to receive pumped milk, wherein the diaphragm functions to create a vacuum within the first chamber and the volume equalization and diffusing chamber conditions the vacuum being applied within the nipple tunnel.

In another particular embodiment, there is provided a dual breast pump assembly including one or more of a pump assembly, a first flange spaced from a second flange, a control panel, a flex conduit, the flex conduit connected to the pump assembly and including a first tube operatively associated with the first flange and a second tube operatively associated with the second flange and a milk container, the milk container including a first connector for connecting to the first flange and a second connector for connecting to the second flange. Automatic assignment can occur when the pumps are in an upright or other position as determined by an accelerometer or other pump subassembly functionality, and/or one or more of when the pumps being relatively close together or when a pumping session has commenced.

In further aspects, a breast pump system can further include heating and/or vibration elements configured to transfer such energy directly to a breast or through a flange to thereby facilitate the expression of milk from a breast. In one aspect, the assembly can further or alternatively house a vibrational motor. Other forms of energy can also alternatively or additionally be applied to the breast, such as ultrasound.

In yet a further embodiment, a breast pump system is configured with structure that provides a user with the ability to collect milk within a bra by connecting a conventional pump to in-bra structure. In one aspect, approach the breast pump system includes an adapter assembly that converts or is embodied in a breast pump subassembly that cooperates with one or more conventional breast pumps configured to reside outside of the bra. In this way, an in-bra breast pump structure and assembly can be connected to various conventional breast pump systems.

These and other features of the disclosure will become apparent to those persons skilled in the art upon reading the details of the systems and methods as more fully described below.

DETAILED DESCRIPTION OF THE DISCLOSURE

Before the present systems and methods are described, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the disclosure. The upper and lower limits of these smaller ranges may independently be included or excluded in the range, and each range where either, neither or both limits are included in the smaller ranges is also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the present disclosure, the preferred methods and materials are now described. All publications or applications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. Thus, for example, reference to "a sensor" includes a plurality of such sensors and reference to "the pump" includes reference to one or more pumps and equivalents thereof known to those skilled in the art, and so forth.

The publications or applications discussed herein are provided solely for their disclosure prior to the filing date of the present application. The dates of publication provided may be different from the actual publication dates which may need to be independently confirmed.

Various details of related systems can be found in U.S. application Ser. No. 15/083,571 (now U.S. Pat. No. 9,539,376), Ser. Nos. 15/361,974; 15/362,920; and Ser. No. 15/406,923 (now U.S. Pat. No. 10,434,228) each filed Jul. 21, 2015; Ser. No. 16/050,201 filed Jul. 31, 2018; and Ser. No. 17/095,892 filed Nov. 12, 1920, each of which are hereby incorporated herein, in their entireties, by reference thereto.

Figure 1A:
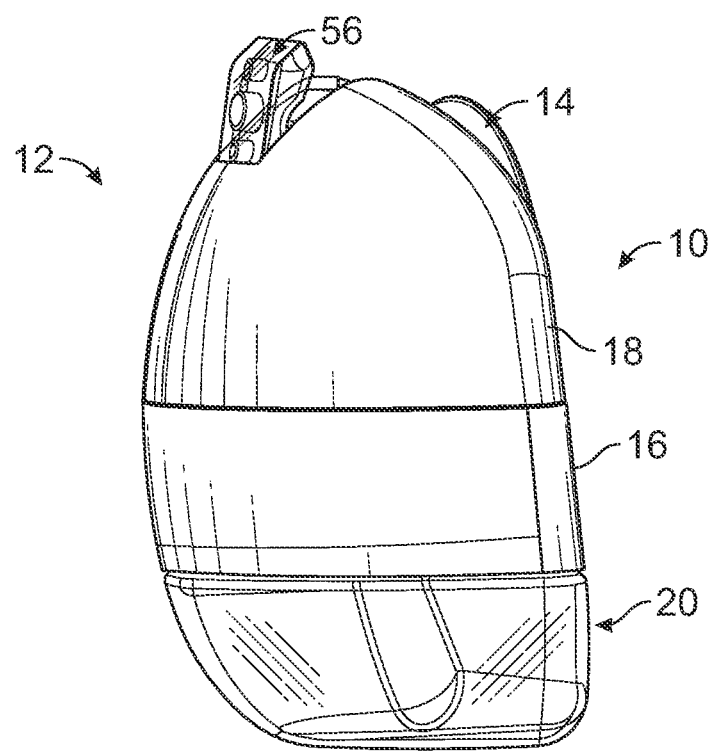
FIG. 1A shows a perspective view of a breast pump system according to an embodiment of the present disclosure.
Figure 1B:
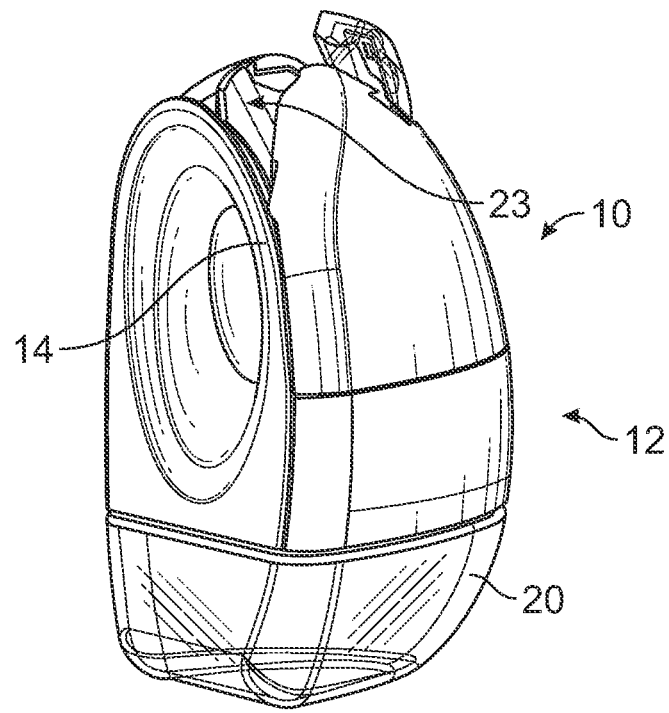
FIG. 1B is an angled side view, depicting the flange of the pump system of FIG. 1A.
Figure 1C:
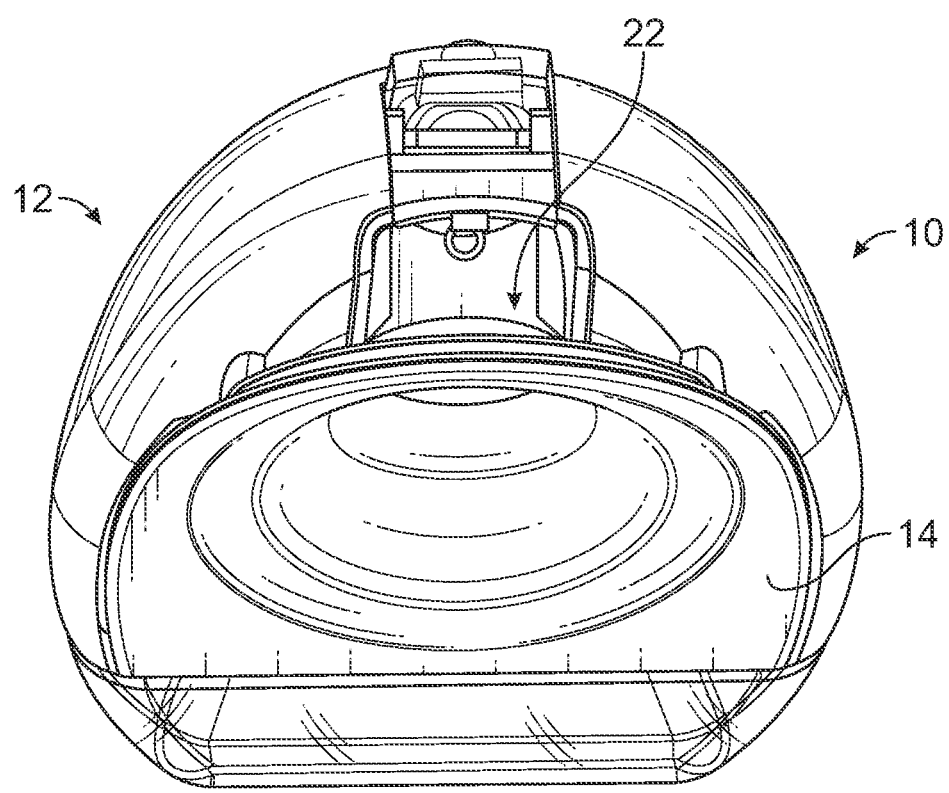
FIG. 1C is an angled top view, depicting a viewing window of the pump system of FIG. 1A.

FIGS. 1A-C are perspective and angled views of a breast pump system 10 according to an embodiment of the present disclosure. The breast pump system 10 can include one or more of the below introduced or described features or functions, or a combination thereof. The housing or outer shell 12 of system 10 can be shaped and configured to be contoured to the breast of a user and to thus provide a more natural appearance when under the clothing of the user. As can be appreciated from the figures, the system can define a natural breast profile. The natural breast profile is contemplated to fit comfortably and conveniently into a bra of a user and to present a natural look. As such, the profile is characterized by having a non-circular base unlike that embodied in a generally dome-shaped configuration. Extending from the base are curved surfaces having asymmetric patterns. Moreover, like natural breasts, the profile of the device or system is contemplated to define one or more asymmetric curves and off-center inertial centers. Various natural breast shapes can be provided to choose from to the tastes and needs of a user. An opposite side of the pump system 10 is configured with a flange 14 which is sized and shaped to engage a breast of a user. The flange 14 is contoured to comfortably fit against a wide range of user's bodies and to provide structure for sealingly engaging with breast tissue. In one particular embodiment, the flange 14 can form generally rigid structure, and alternatively or additionally unlike a standard flange can lack sharp edges or a lip portion against which breast tissue might be engaged during use. In this regard, the flange includes surfaces that extend outwardly from a nipple receiving portion of the flange to engage breast tissue, thus providing extra surface area for comfortably contacting tissue.

A chassis 16 forms a central sub-structure of the breast pump system 10, and a portion thereof forms an outer surface of the shell 12. The chassis 16 thus connects to the flange 14 as well as to an upper portion 18 of the shell assembly and the fluid container outer shell 20. Moreover, as will be described below, the chassis 16 also supports components of the peristaltic drive assembly.

As best seen in FIG. 1C, the flange 14 is sized and shaped to receive the breast of user of the breast pump system 10. In one aspect, the flange 14 can be made from transparent material, or a portion of the nipple receiving portion 22 can be made from transparent material. Additionally, the upper portion 18 of the shell 12 can be formed such that a direct visual path to the nipple receiving portion 22 is provided to the user through a viewing window 23. In this way, both breast alignment and milk flow can be observed by the user and adjustments can be made to alignment based upon direct visual cues. In an alternative or additional approach, the system can be configured to recognize a universal nipple accessory that the user attaches to their breast and the same can be used to by the system to automatically assist in alignment such as by the use of an internal camera in combination with a light source, for example.

The flange or breast contact portion 14 can be symmetrical about the nipple receiving portion although, alternatively, the nipple receiving portion could be offset. The flange or skin contact member 14 is designed to reduce the internal volume of the nipple receiving portion, which is enabled by the significantly reduced amount of motion experienced by the nipple during a milk extraction process using a system 10 including skin contact member 14, according to the present disclosure. The nipple receiving portion 22 of the skin contact member 14 is contoured to more closely match the natural shape of the nipple, thereby eliminating or significantly reducing dead space that exists around the nipple in prior art systems. The nipple receiving portion 22 can be cylindrical in the portion adjoining the breast contact portion, and then can taper conically. This design allows for receiving a portion of the areola into the nipple receiving portion while also limiting dead space. The diameters of all cross-sections of the nipple receiving portion 22 are contemplated to be large enough to allow nipple dilation. The length of the nipple receiving portion can be about 23 mm and the length may vary within a range of about 15 mm to about 30 mm. The length of the nipple receiving portion 22 is sufficient to allow engorgement of the nipple under vacuum, without the distal tip of the nipple contacting the proximal end of the nipple receiving portion. In an alternative approach, the nipple receiving portion 22 can be sized and/or shaped to mimic the anatomy of a child that is nursing. In this regard, rather than being generally cylindrical, the nipple receiving portion 22 define more of a natural mouth shape or a generally rectangular sleeve with rounded corners and curved surfaces. The teat of the breast is thus formed into a more natural nursing shape by the natural shaped nipple receiving portion.

The internal contour of the flange 14 is designed for use with the present system 10 and to maximize comfort of the user. The internal angles and generally flat portions also facilitate the ability to restrict portions of the breast from moving forward too much into the nipple receiving portion. The wider angle helps to prevent the breast tissue from being funneled into the nipple receiving portion, so that less breast tissue is received in the nipple receiving portion, making use of the flange 14 more comfortable and provides space for nipple engorgement. By providing the wider angles, this also allows the overall system to be effectively shortened and allows the system to lie flatter against the breast to improve both comfort and appearance.

Figure 2A:
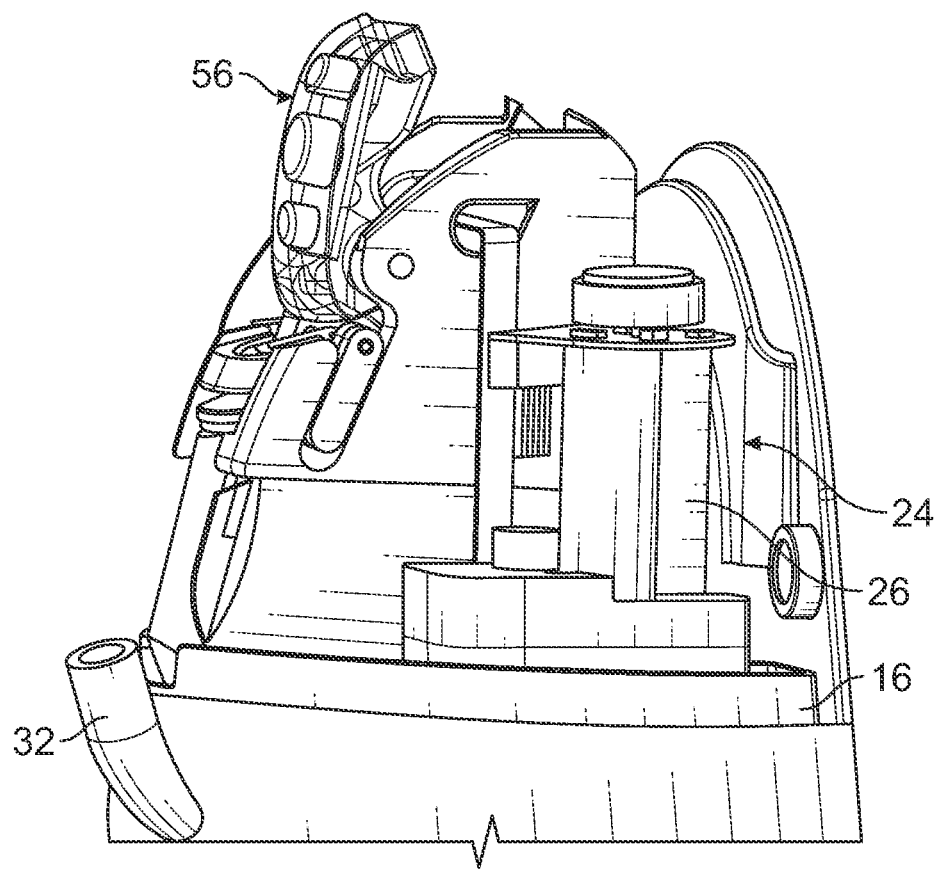
FIG. 2A is a side view, depicting selected internal components of the pump system of FIG. 1A.
Figure 2B:
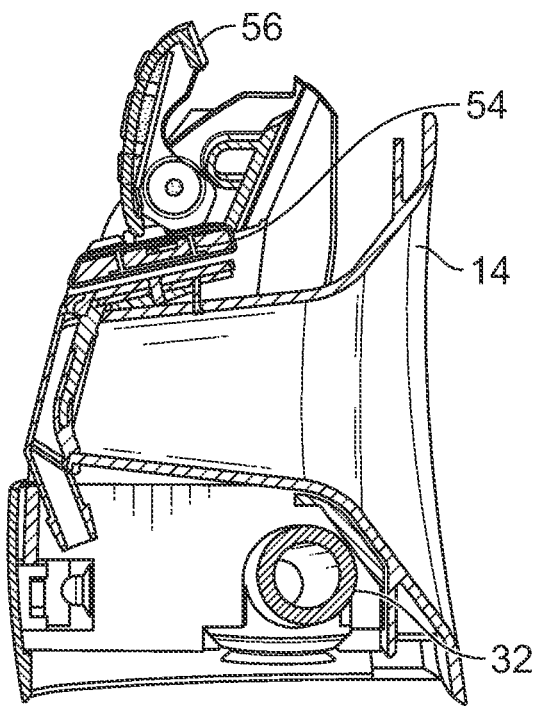
FIG. 2B is a side cross-sectional view, depicting a pressure sensor and a drain on the breast.
Figure 3:
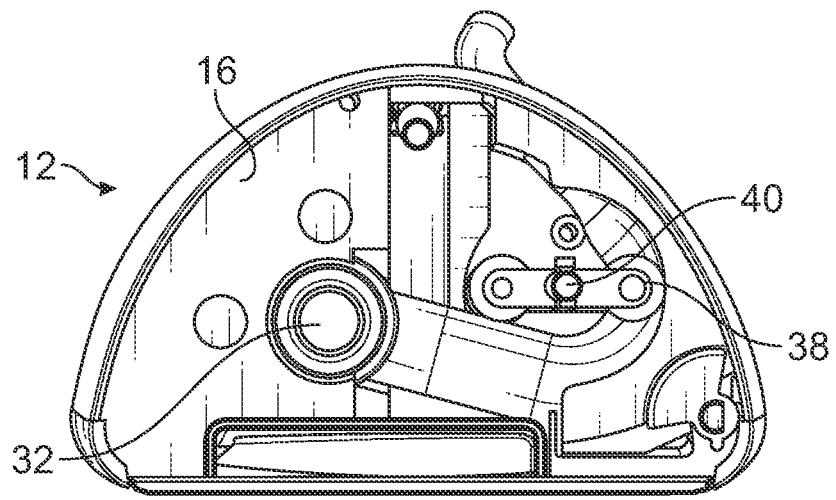
FIG. 3 is a horizontal cross-sectional view, depicting components of the peristaltic drive assembly of the system of FIG. 1.

Referring now to FIGS. 2A-B and 3, there are shown selected components of the breast pump system 10. As shown in FIG. 2A, the chassis 16 supports components of the peristaltic pump system 24 including a motor 26 and associated electronic components. Notably, there is provided a conduit 32 connects the nipple receiving portion 22 to a milk collection container defined by or contained in the container shell 20 (FIG. 1A), as is described in more detail below. The milk collection container is configured below the nipple receiving portion 22, and the conduit 32 is routed downwardly to the container. As such gravity can assist in advancing fluid to the container such as during purging. Additionally, or in an alternative approach, a valve at the top of the fluid path or a tortuous air path can be provided to release any excess air from the system to aid gravity in the advancement of fluid to the container.

As best seen in FIG. 3, the peristaltic pump system 24 includes a pair of spaced roller compression members 38 attached to a pinion 40 which is driven by the motor 26 (See FIG. 2A). Whereas the peristaltic pump system 24 includes two roller compression members 38, more compression members can also be used in alternative embodiments. In operation, the motor 26 rotates the pinion 40 which in turn causes the roller compression members 38 to rotate and selectively engage and compress the conduit 32. Such action functions to both provide the desired vacuum on the breast as well as move the extracted milk to the milk collection container.

Figure 4A:
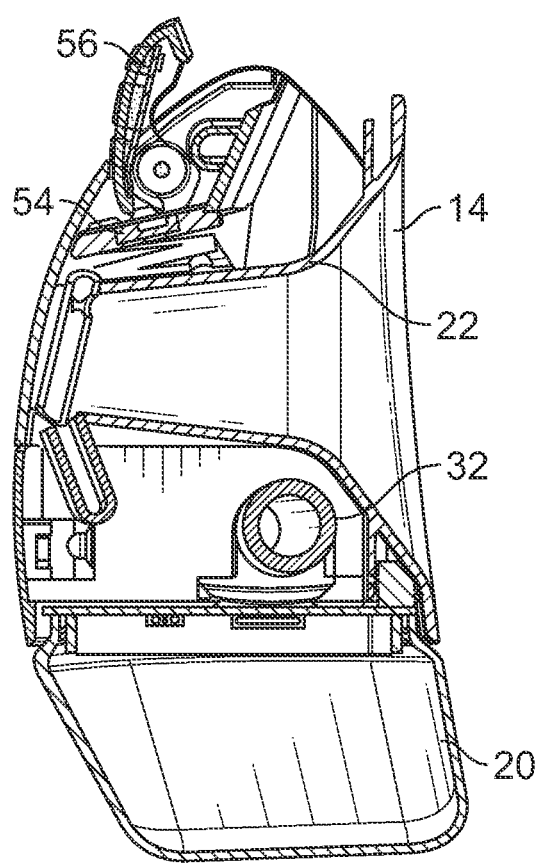
FIG. 4A is a longitudinal cross-sectional view, depicting aspects of the pressure sensor of the system of FIG. 1.
Figure 4B:
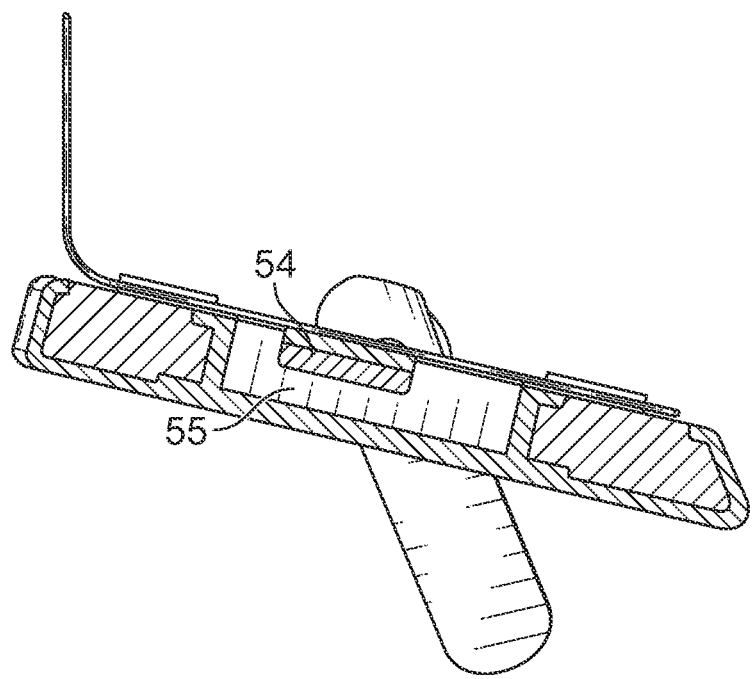
FIG. 4B is a side isolated view, depicting the pressure sensor of FIG. 4A.
Figure 4C:
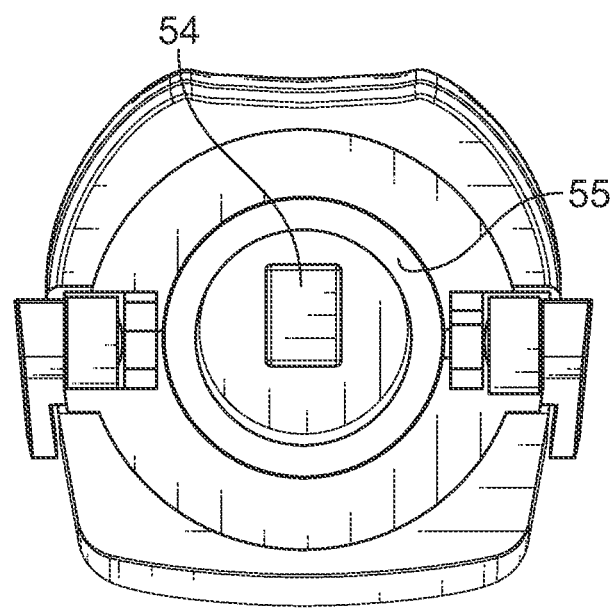
FIG. 4C is a top isolated view, depicting the pressure sensor of FIG. 4A.
Figure 4D:
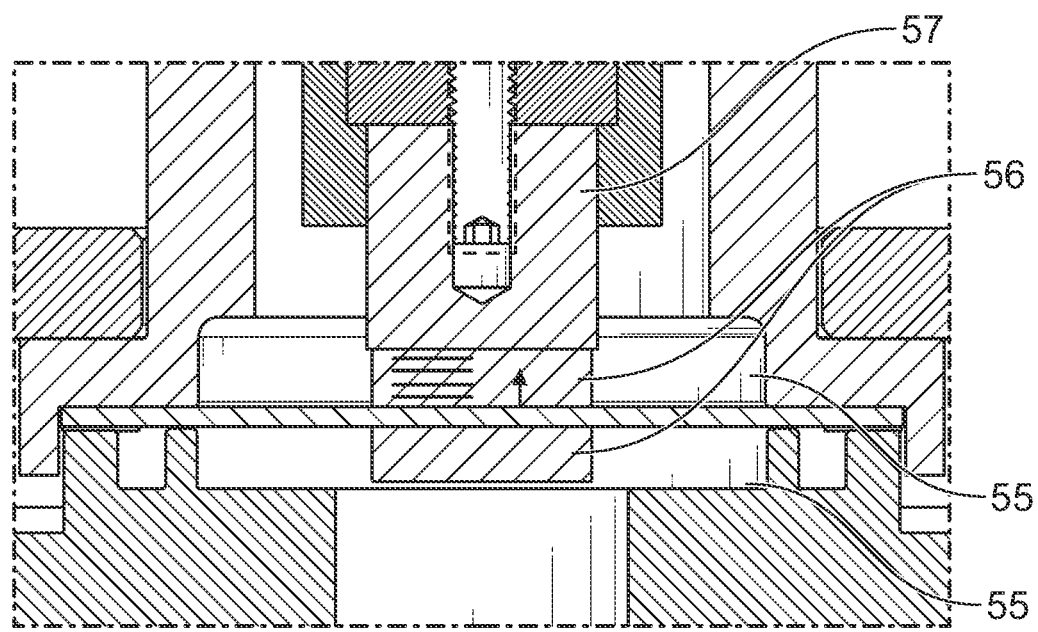
FIG. 4D is a partial cross-sectional view, depicting an alternative approach to a pressure sensor.

Additionally, there is provided a pressure sensor 54 that functions to detect and monitor the vacuum pressure being applied at the breast (See FIGS. 4A-C). The pressure sensor 54 is configured within a membrane of silicone 55 that flexes in response to vacuums applied to the breast. The membrane 55 is used to separate the pressure sensor 54 (which can also be a load cell) from the fluid path so that it is not a component requiring cleaning. Pressure at the breast is measured through the translation of the silicone membrane 55 at the nipple receiving portion 22. In one aspect, the membrane 55 flexes over a 10 mm diameter hole, where the micro-pressure sensor is hermetically sealed to one side of the membrane and the nipple receiving tunnel 22 is sealed to the opposite face of the membrane 55. In this way, pressures can be measured throughout a pump session. In an alternative approach (FIG. 4D), a first silicone membrane 55 enclosing a magnet 56 is attached to the nipple receiving portion 22 and a second magnet 56 is attached to a loadcell 57, which is attached or configured within to a second membrane 55. It is to be noted that the membrane 55 can assume a myriad of shapes, including a diaphragm, flat sheet or a c-shape. As a vacuum is created in the nipple receiving portion 22, the loadcell 57 will measure the forces created, with little to no movement of the silicone membrane 55. Here, the load cell 57 membrane 55 is provided with a positive bubble so that when assembled, the pressure sensor 54 is set to read a positive pressure and thus the application of a vacuum to the nipple receiving portion 22 are measured as changes to the positive pressure, which allows for use of a pressure sensor that does not operate in negative pressures.

Further, in one embodiment, a rotatable lever 56 (spoon) is configured to selectively disengage or unlock the sensor 54 to permit air to enter the flange and thus offset, control or remove the vacuum being applied to the breast.

As milk enters the system, the suction level decreases (pressure increases). The feedback provided by pressure monitoring via pressure sensor 54 provides input to a feedback loop that adjusts the position of the roller compression members 38 of the peristaltic pump assembly 24 to maintain the desired vacuum (pressure) within the conduit 32 by compensating for the changes in pressure that occur to changing amounts of milk in the conduit 32. This modification can be addressed by either slowing the movements of the roller compression members to achieve the same timing cycle for pumping, or increasing the cycle frequency due to the less time taken for the shorter movements of the roller compression members 38. In one particular embodiment, the pressure sensor 54 provides information relative to latch of the breast pump to a breast, and such information can be communicated via BLUETOOTH or the like to control pump function to achieve a desirable or target latch. In one aspect, the user can control the degree of latch of the breast pump to the breast and/or turn latch off or on.

In general, real-time pressure control of the breast pump system can be managed by a controller (not shown) of the system 10. The controller tracks pressure and moves the pump motor either to influence the pressure in the direction of its choosing. By way of oscillating motion of the motor, the pump can be configured such that the roller 38 components of the peristaltic pump assembly 24 engage the conduit 32 structure to change its volume. If there is vacuum in the system 10 that vacuum can be increased as the volume of the tube is manipulated. Pushing in the tube decreases its volume. This in turn causes the vacuum level to change in the tube. The pump controller applies these principles, sensing the current pressure and then adjusting the roller compression members 38 of the peristaltic pump assembly 24 in a direction required to generate a pressure target. By doing this repeatedly in real time, the system can create a controlled vacuum waveform that matches waveforms desired to be applied to a user's nipple. In one particular aspect, the system generates a varying vacuum on the breast, the varying vacuum being a repeating waveform from low vacuum to a higher vacuum then returning to the low vacuum. Here, the waveform period is divided into sections of specified duration such that there can be one section with a duration of the waveform period or if there are multiple sections, the sum of each section duration equals the waveform period and the vacuum for each section is specified by a mathematic function. Such an approach allows for control of the rate of vacuum change when increasing and decreasing vacuum.

The system can further be provided with automated letdown detection. The pump can sense when it is full of fluid and responds accordingly by switching between pumping and letdown when fluid has begun to flow. In one approach an algorithm incorporated into the system can operate to look at the ratio of maximum and minimum of a target wave in the pump and compare that against the output of the pump. The result is a unit-less but very reliable sensing of system compliance. This can be tuned to trigger an internal event when the compliance crosses some known values that represent when the system is full of fluid. Any other measurement of compliance can be used in an equivalent way.

In another approach to letdown detection, it is noted that pushing a tube of air does not generate the same forces as pushing a tube of fluid. Tracking the force generated during a purge can also give a strong indication of when the system is full of fluid. An event can be generated to track this such that when the force of a purge crosses some known threshold the system can be said to be full of fluid rather than air. This approach may involve less tracking of data and less tuning that is subject to change with pump design or breast tissue. In yet another approach, letdown detection can be based upon tracking flow. That is, when flow begins, letdown must have occurred and when a small volume of flow has been collected the system can switch to pumping. Further, letdown can be tracked by looking at the relative rate of change of vacuum measured to motor position. Note that this relative rate of change is a measurement of compliance. As this ratio goes up in magnitude, it can be concluded that the system is filling with fluid.

A system controller or system software and/or firmware controls the action of the roller compression members 38 in real time, responsive to pre-determined latching and production targets or schemes as detected by the pressure sensor 54. The firmware can be written so that such targets can be approached at various speeds, sometimes relatively quickly and other times more slowly or gently to thereby provide multiple stimulation and expression levels. Thus, for example, latch can be achieved taking alternatively more gradual or quicker approaches, and there can be controls determining the level at which latch is achieved. Various levels of suction can be present during expression as well.

Upon commencing milk extraction, the peristaltic pump assembly 24 can function in the same manner as in latching, but in a manner that follows an extraction waveform determined by the selected extraction pumping determined in real time by system controls which are responsive to the pressure sensing assembly. Continued cyclical compression of the conduit 32 by the roller compression members 38 of the peristaltic pump assembly 24 increases the pressure in the conduit 32 downstream to establish a positive pressure to drive the contents (milk) of tube out of the tube through a one-way valve to the milk container assembly. The positive pressure attained is sufficient to open the one-way valve for delivery of the milk out of the conduit 32 and into a milk collection container. In one embodiment, the positive pressure is in the range of 20 mm Hg to 40 mm Hg, typically about 25 mm Hg. In an alternative or additional embodiment, the one-way valve can be configured to crack open when the user breaks latch so that any milk remaining in the system will automatically drain into the milk container.

The present disclosure can establish a latch vacuum to cause the flange or skin contact member 14 to seal to the breast. The latch vacuum established by the system is currently about 60 mmHg, but can be any value in a range of from about 20 mmHg to about 100 mmHg. Once the system 10 has been latched to the breast via flange or skin contact member 14, the system then cycles between the latch vacuum and a target (also referred to as "peak" or "maximum") suction level. Due to the fact that the system 10 does not cycle down to 0 mmHg, but maintains suction applied to the breast, with the minimum end of the suction cycle being the latch suction level (e.g., about 60 mm Hg), the nipple does not contract as much as it would with use of a prior art breast pump system. It has been observed that the nipple draws into the skin attachment member 10 with the initial latch achievement in an analogous fashion as the formation of a teat during breastfeeding. Once the vacuum cycles between the latch and target vacuum levels, there is significantly less motion of the nipple back and forth with the vacuum changes. The nipple motion (distance between fully extended and fully retracted) during use of the present system is typically less than about 2 mm, and in some cases less than about 1 mm. Accordingly, the system provides latching that is not only more like natural nursing, but the reduced nipple motion is also more like natural nursing as evidenced by scientific literature.

This greatly reduced motion of the nipple during cycling results from establishment of the latch at latch vacuum level, and then limiting the range of vacuum swing between latch vacuum (suction) and peak vacuum (suction). Typically the difference in vacuum between latch vacuum and peak vacuum is less than 200 mmHg, more typically less than 150 mmHg. In one example, the latch vacuum was 50 mmHg and the peak vacuum was 200 mmHg, resulting in a vacuum difference of 150 mmHg.

Limiting the nipple motion as described with use of the present system offers several benefits to the user. One benefit is that there is less friction on the side of the nipple against the flange wall, thereby greatly reducing the risk of irritation, skin damage, pain, swelling, etc. As a result, the present system is significantly more comfortable to use by a nursing mother, and this benefit is increasingly noticeable over repeated uses. By maintaining at least a latch suction level at all times, the present system provides a more secure and persistent seal to the breast and significantly reduces the potential for leaks of air and/or milk. Because the nipple moves significantly less, this provides a more "natural" feel to the user that more closely simulates the feel of a nursing baby. Because the nipple travels less, this allows for the skin attachment member/flange 14 to be designed as a lower profile component, as its length can be shorter since it does not need to accommodate the greater length in nipple movement experienced by prior art systems. This allows the overall amount of protrusion of the system 10 from the breast to less than that in the prior art, as the overall length of the system is reduced by the reduction in length of the skin contact member/flange 14. Thus, the distance from the tip of nipple to exposed end of the housing the system is reduced.

During let down operation, the system 10 operates to effect let down of the milk in the breast, prior to extraction, with a maximum suction target of up to 120 mmHg (typically, about 100 mmHg (−100 mmHg pressure)) to establish let down. The goal of letdown (or non-nutritive suction) is to stimulate the breast to express milk. The relatively shallow (small vacuum change range) and relatively fast frequency of the pumping during this phase are meant to mimic the initial suckling action of a child at the breast. This is because during let down phase, the suction pressure is not allowed to exceed the maximum let down suction of 110 mmHg or 120 mmHg, or whatever the maximum let down suction is set at. Therefore, the system 10 is designed to reach −100 mmHg (a suction pressure of 100 mmHg) (or −120 mmHg, or whatever the maximum let down suction is designed to be).

During let down (non-nutritive) the system software and/or firmware communicates instructions to system motors based upon readings taken and communicated from the pressure sensing assembly so that the system is configured to operate between −60 mmHg and −100 mmHg in one example. The maximum latch suction pressure of −100 mmHg will be reached with a small amount of rebound of the conduit 32.

The system 10 is responsive to pressure changes within the conduit 32 caused by entry of milk into the conduit 32. When electrically-powered drivers are used, a battery (not shown) is electrically connected to the peristaltic pump assembly 24, as well as the controller and pressure sensor 54, and supplies the power necessary to operate the peristaltic pump assembly 24 to drive the compression and retraction of the roller compression elements 38.

The sensor 54 is used to provide feedback to the controller for controlling the pumping cycles to achieve and/or maintain desired vacuum levels. Sensor 54 is preferred to be a sensor capable of providing information usable to monitor the safety or function of the pump mechanism of system 10. As shown, sensor 54 is a non-contact sensor 54, meaning that it is not in fluid communication with the milk or vacuum space of the system 10. In an alternative approach, the sensor can be one that is configured to contact milk and be cleanable as needed. Here, a seal would be formed around the sensor element that is for example, positioned as a protrusion from the flange and to directly make measurements.

As described above, the conduit 32 is placed in operative connection with a motor. The positioning of the motor is tracked and the vacuum force information provided by the sensor 54 is assessed to determine internal vacuum. By employing machine learning or supervised learning regression techniques, the system 10 can be trained to interpret the motor positioning and sensor data (as well as motor speed or pump settings), while compensating for noise and hysteresis, to arrive at a pressure/vacuum level. More specifically, a neural net system or any mathematical regression of the data can be incorporated into system firmware so that sensor input can be translated to pressure/vacuum levels. In this regard, the system 10 can include or communicate with a non-transitory computer readable medium having stored thereon instructions executable by a computing device of the system or external to the system to cause the computing devices to perform functions associated with and directed by the firmware.

Moreover, in one or more of the disclosed embodiments, the system controller can be configured to distinguish whether it has been attached to the left breast or the right breast of the user. This can be useful for tracking milk volume output per breast, per session, total daily volume per breast, etc. When using two of the pump systems, the tracking of data for each breast can still be maintained accurately, even when one of the pump systems 10 is attached to the left breast during a current pumping session after having been attached to the right breast during a previous pumping session. In one embodiment, the pumping systems 10 can establish current location (i.e., left or right breast) by receiving a signal from the other pumping system having been attached to the other breast. This established relative left-right locations of the two pumping systems 10, so that each system 10 can accurately record as to whether milk is being extracted from the right breast or left breast. This identification is automatic, without any user input required and it also relieves the burden on the user to otherwise keep track of which pump system 10 is placed on each breast and to maintain this order with each successive pumping session. Left and right pump labeling is also contemplated such as by placing markings on the system housing or cover jack, for example, near the power connector.

In one particular approach, two breast pumps provided for use are identical, in hardware, firmware and configuration. At the time a mother puts them on her breasts, the two pumps use BLE (blue tooth low energy) radios to determine if they are put on the left or the right side breast. The information as to whether a pump is on the left side or on the right side breast is used by a Mobile App/Cloud data backend system to track breast side specific milk volume in cooperation with a system controller. One on the left side of the pump/PCBA and one of the right side of the pump/PCBA. Automatic assignment as to breast side can occur when the pumps are in an upright or other position as determined by an accelerometer and one or more of the pumps being relatively close together (20 to 40 cm) and when a pumping session has commenced. The pump controller can drive a switch to select which antenna to use. When put on the breast the pumps start a BLE advertising pattern using opposite side BLE antennas. When the left pump uses its left side antenna, the right pump will use its right side antenna and vice versa to send and receive BLE advertising packets. The side assignment process includes sending and receiving a couple of advertising packets to the pumps in coordination with switching which antenna is to be used. Based on the increased distance when using the outer side antennas vs. the inner antennas, the BLE radio will measure increased/decreased RSSI (received strength signal indicator) values which in turn can be used to determine which side a pump is on. The measured signal strength will be lower when using the two outer side antennas versus the two inner side antennas. When a pump has found a side assignment signal it starts changing the data in its own side assignment signal. A connection-less protocol, no hand shakes or acknowledgment approach is contemplated. In practice, a pump with a higher serial number can be the primary where the lower serial number becomes the secondary, and the primary dictates which BLE antenna to use (left or right) through the side assignment process. Also, pumps can use opposite BLE antennas to either get minimum distance or maximum distance between antennas. Further pumps measure RSSI as left-right and right-left antenna combinations and compare values and based on measured RSSI it is possible to determine which pump is left and which is right. By taking this approach, manufacturing can be reduced to a single line producing identical pumps which can be used on either breast, without a need for a user to check for left and right pump labels.

In an alternative approach, a single antenna with uneven gain can be employed to facilitate identifying individual breast pumps. An uneven gain antenna does not generate an evenly strong signal in all directions so the generated signal is stronger in one direction and weaker in another. Accordingly, such uneven gain antennas can be installed in pumps such that the signal strength is stronger on the left side of a pump, for example, than on a right (or vice versa), then the difference in signals can be used to determine which pump is on which breast.

Figure 5A:
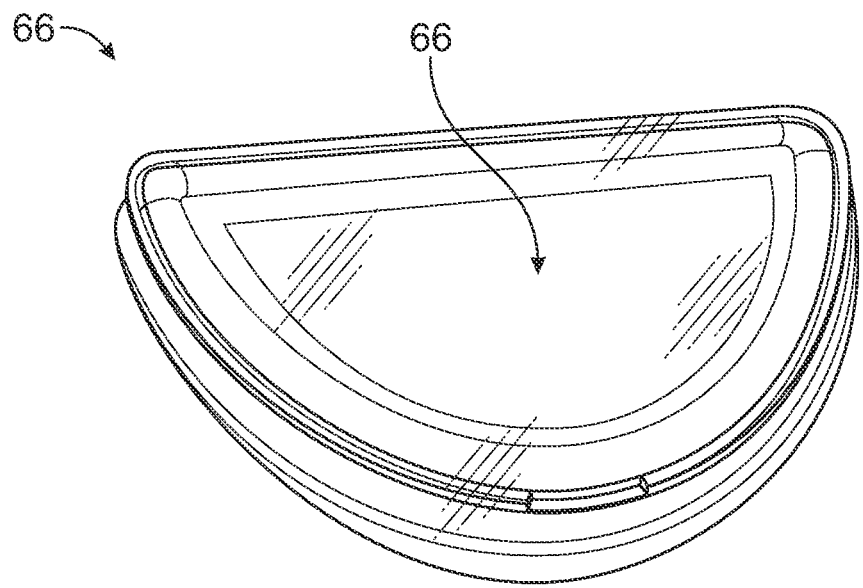
FIG. 5A is a top view, depicting one approach to a storage collection assembly.
Figure 5B:
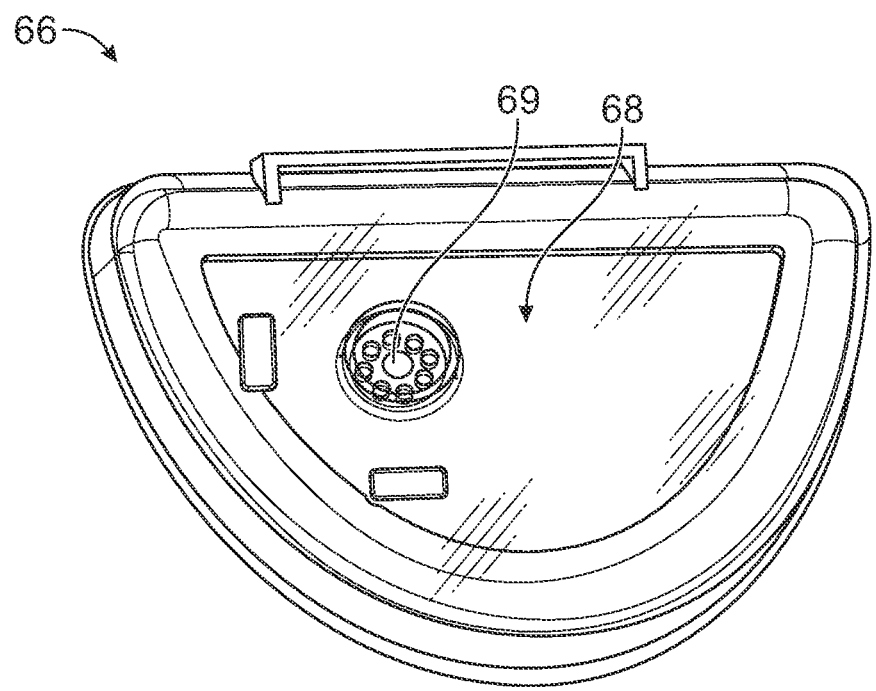
FIG. 5B is a top view, depicting the storage collection assembly of FIG. 5A including a lid with a valve.
Figure 5C:
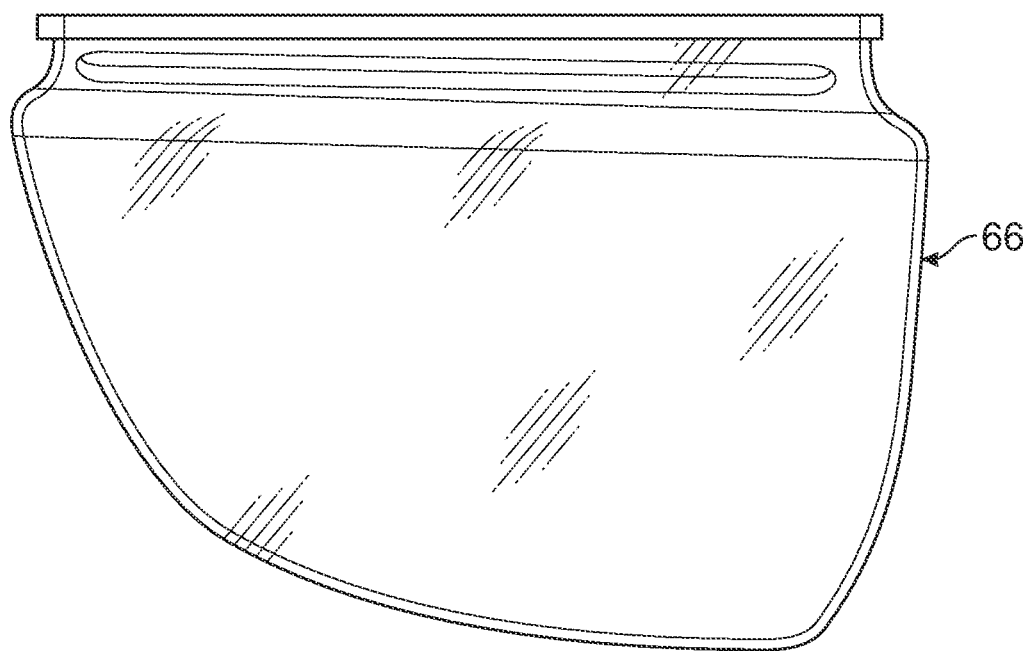
FIG. 5C is a side view, depicting the storage collection assembly of FIG. 5A.

Turning now to FIGS. 5A-C, one embodiment of a collection or container assembly is shown. The container assembly is sized and shaped to mate with a bottom of the outer shell 12, flange 14 and the chassis 16 (FIG. 1A). In this approach, a disposable container or insert 66 is sized and shaped to be received within the container shell 20 (See FIG. 1A), and can be removed therefrom once pumping is completed. A disposable lid 68 is also provided to seal the top of the disposable container 66 so that the assembly can be stored or transported without spilling. The lid can also be equipped with a fitment or valve 69 for mating with the conduit 32.

Figure 6A:
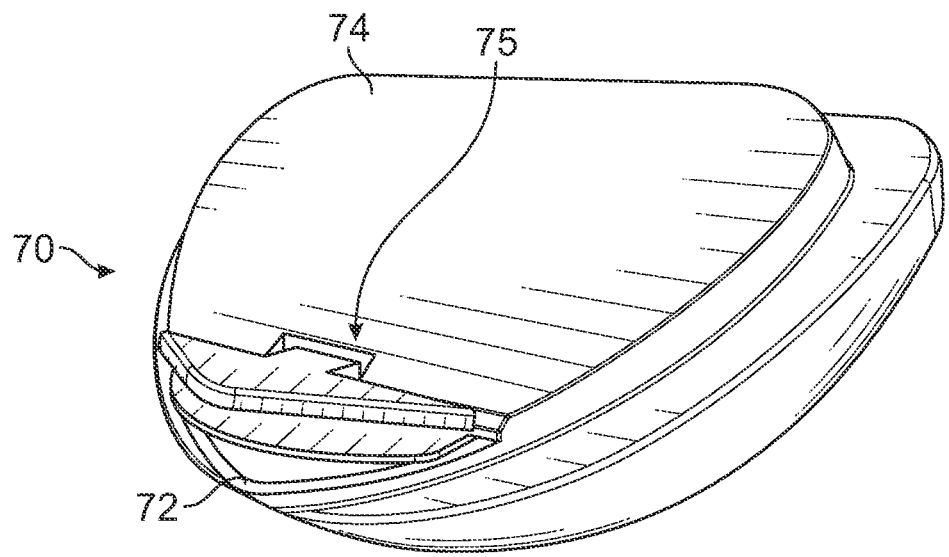
FIG. 6A is a perspective view, depicting another approach to a storage collection assembly with a hinged lid.
Figure 6B:
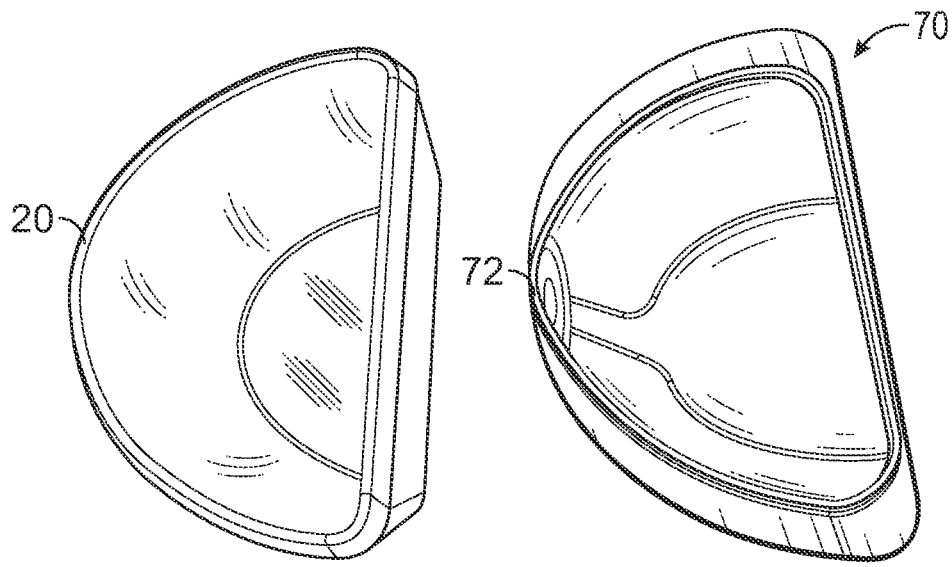
FIG. 6B is a top view, depicting a storage collection assembly including an insert with a pour spout.

In another approach (FIGS. 6A-B) reusable container or insert 70 is sized and shaped to fit within the container shell 20, and includes a pouring spout 72. A storage lid 74 is also provided and can include a hinged door 75 for closing about and providing access to the spout 72.

The container assembly can embody double thermoformed layers with a fitment and/or valve incorporated therein, and configured to attach to a shaped container such as the container shell 20 while under vacuum. The assembly can also be defined by a dual thermoformed layered bag with fitment and no valve configured therein and be configured to attach to the container shell 20, for example. These approaches to containers can be stacked and the top thereof can become shaped convexly when accepting fluid. When the assembly lacks a valve, the user can expand the bag when pulling portions of the bag in opposite directions. Also, the container assembly can be embodied in an assembly including a bottom thermoformed layer made from a film or thin plastic, and when having a thin plastic layered bottom, the bag may not need a container shell. Alternatively, the container assembly can include a single thermoformed bottom portion or layer with a flat top layer formed from a thicker material. Air can be removed from this assembly via a vacuum during the manufacturing process and where the assembly includes a valve. When defined as a single thermoformed structure, the container bags can be attached to each other and include a tearaway connection between containers. As such, the connected containers can be rolled when packaged or configured in a stacked in a serpentine manner.

Figure 7A:
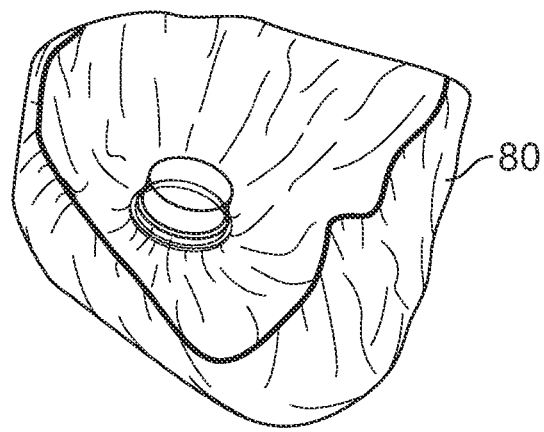
FIG. 7A is a perspective view, depicting a liner for a storage collection assembly.
Figure 7B:
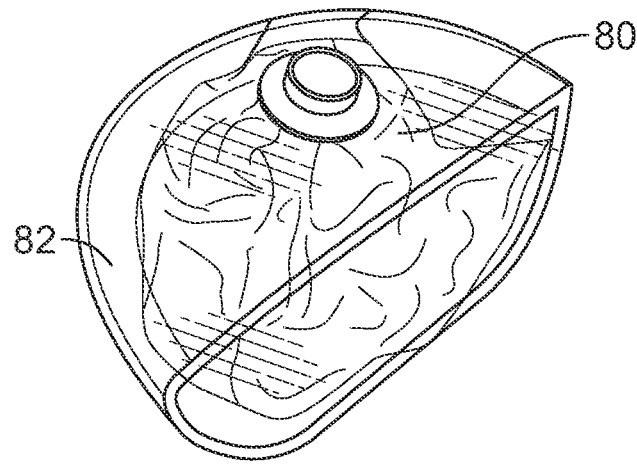
FIG. 7B is a perspective view, depicting the liner placed within an outer shell of a storage collection assembly.
Figure 7C:
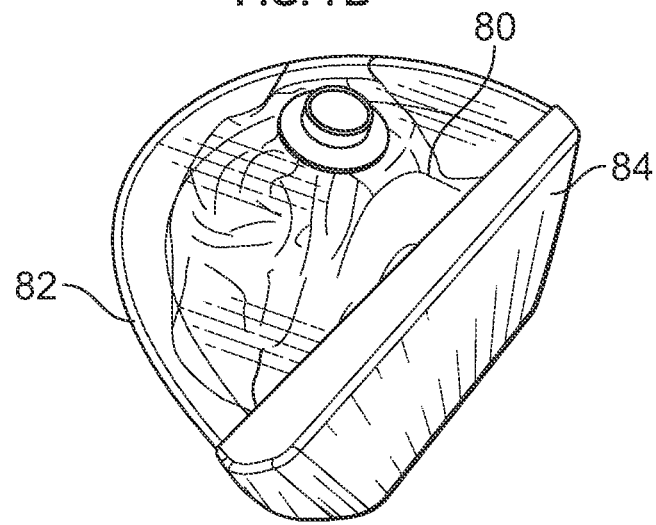
FIG. 7C is a perspective view, depicting an assembled a storage collection assembly.

With reference to FIGS. 7A-C, there is shown a thermoformed bag container or insert 80 that includes a valve and/or fitment attached thereto. The bag container 80 is sized and shaped to fit within the container shell, or a container housing 82 that has the outer profile of the container shell. The container housing includes a side lid 84 that encloses the bag container 80 within the assembly. In one or more additional or alternative embodiments, the container defines a reusable silicone structure, or includes a porex patch.

It is contemplated that the system is configured to pump into a sealed collection or container assembly, or one that incudes an integral valve or an otherwise airtight collection or container assembly, or combinations thereof. In this specific regard, the system can alternatively or additionally be closed and never vented to the atmosphere, and/or the system suction is only reduced through the flow of milk into the system. Thus, in at least one approach, milk or fluid that is pumped through the system is never exposed to new outside air from the environment once it enters the collection or container assembly. Accordingly, the orientation of the pump system or person has virtually no impact on the functioning of the system (i.e., no spills). The collection or container assembly can include a rigid or flexible sealing component, such as a ring or gasket into which the pump or container valve is pushed or twisted and sealed. The collection or container assembly can also include an opening or hole or structure that is pierced such that the container assembly seals about the member that goes into it.

In at least one embodiment, the pressure at which the valve to the container assembly opens to allow flow into the milk collection container is about 25 mm Hg. The valve can be configured and designed such that it allows fluid to flow through it when the pressure in conduit 32 is positive, e.g., about 25 mm Hg, or some other predesigned "crack pressure".

Once the flange or skin contact member 14 is placed onto the main body/pump housing then pump power can be engaged (FIG. 1C). As the pump system 10 goes through a power up routine, the controller reads the pressure sensor 54 (FIG. 2B). The controller then calibrates the system such that the preload force or position or measured load equates to atmospheric pressure. Based upon a neural network or computer learning, such pressure readings in the system 10 are observed during operation of the breast pump system 10 and upon attachment to the breast.

The system 10 can calculate the volume of milk pumped into system or alternatively the volume collected in the milk collection container assembly. By knowing the dimensions of the conduit or tubing 32 downstream of the roller compression members of the peristaltic pump assembly 24, the overall volume capacity of the system 10 can be calculated (FIG. 3). Tracking of the position of the roller compression members 38 relative to the tube 32 dictates the volume change in the conduit 32. As the pumping process is carried out, pumping/purging of milk into the milk collection container is tracked to calculate the change in volume of milk that is pushed into the milk collection container.

Various approaches to assessing milk volume can be included in the pump system. Certain approaches are described in co-pending U.S. application Ser. No. 15/448,716, the entirety of contents of which are incorporated herein by reference. A further approach to assessing expressed milk volume involves placing one or more disposable data collection devices on the mom or child. One specific approach involves creating a boundary on the skin of a breast and employing a fiducial to conveniently measure the change in size of the boundary. This change in size is then correlated to milk production to arrive at a volume of milk expressed or pumped. A crib or bassinet can also include sensors and communication hardware that communicate with the pump system so both assess and management milk consumption and needs, and baby health.

The system 10 can calculate the pressure during operation in any of the manners described above. The suction (pressure) level can be varied as desired, and by continuously or repeatedly measuring/calculating pressure, the feedback provided by sensor(s) 54 to controller provides a control loop that can be used to adjust the peristaltic pump assembly 24 roller compression members position and/or speed to vary the suction pressure to a level desired, or maintain a desired suction pressure in real time. Thus, controller can control the positions and speeds of roller compression members to achieve any vacuum pressure pumping profile desired, and provide automatic, real time adjustments to maintain a desired vacuum pressure within the system. Also contemplated is responding in real time to maintain flow. This can accomplished independent or in conjunction with monitoring and regulating pressure in real time.

The controller tracks the position of the roller compression members 38 of the peristaltic pump assembly 24 relative to the conduit 32, such as by keeping track of the motor driver position and calculates (or looks up) pressure based upon data received from sensor 54. The system controller or firmware is programmed with or retains information relating values detected by system sensors with driver positions and speed and system pressure. Thus, changes in position and/or speed of the roller compression members by controller can be controlled by resulting changes in pressure calculated or looked up, relative to the pressure sought to be achieved. By using machine learning or supervised learning regression techniques, the system 10 can be trained to interpret the motor positioning and pressure sensing (as well as motor speed or pump settings), while compensating for noise and hysteresis, to arrive at a pressure/vacuum level. More specifically, a neural net system or other mathematical regression can be incorporated into system firmware so that sensor input can be translated to pressure/vacuum levels.

In at least one contemplated embodiment, the system 10 can be configured to communicate with a server, a remote computer, smartphone or other device such as through signal, such as by Wi-Fi, BLUETOOTH, BLUETOOTH Low Energy (BTLE), RFID, NFC or the like. In particular, one or more chips can be incorporated into the controller of the pumping system 10 (by hard wire and/or wirelessly, preferably wirelessly) and configured to be in communication with an external computer. The controller and/or external computer communicates with the sensor(s)/chip(s) which indicate(s) when the system is in use, and can track usage. By tracking the times of use and/or number of uses, or even pump cycle counts, for example, the controller, or external computer can alert the user when it is time to change components or to report on usage aspects. In one particular aspect, the system can be equipped with an accelerometer to track and indicate the motion of the user and the angle at which the pump is used by the user. In this way, information such as the tracking of extraction date and time, volume extracted, etc. can be recorded and stored with regard to each milk collection container used with the system 10 to extract milk, and a correlation can be made regarding the user's mobility or pumping angle respecting milk output and comfort. Moreover, the accelerometer can be employed to change pumping behavior based on the user's position for example, slowing or pausing the pump when the user is in a position or acting in a manner that may cause the system to leak or function improperly or less efficiently. Thus, the system 10 can register individual milk collection containers, so that the user can readily identify when milk in each container was collected, the volume in each container, etc. The breast pump system can record the volume of milk in any given container during a pumping session. The data recorded can be sent to an external computer and/or over the Internet, either automatically or manually. Thus, user data and trends can be collected, stored and analyzed as they relate to volume (from each breast and in total), as can be the number of sessions on several dimensions (per day, week or month). Data and analytics can thus be provided to a user concerning pumping sessions.

In one particular approach, at least the session start time, the session end time and total volume of milk extracted from the breast can be stored and tracked. Sessions can be defined as the commencement of latch and can continue up to and through pauses of up to 5 minutes, for example. Thus, a pause of over 5 minutes can be defined as the end of the previous session. A language protocol is generated so that there is a two-way communication between an external device or program and the breast pump. That is, both the pump and external device can create and understand and are responsive to specific messages. Further, live data and historical data can be treated differently, and their data streams maintained separately. Live updates are generated and stored at the pump and are available by the external device to retrieve (for example, up or down button activations or volume updates). Accordingly, such live data can be reflected on and update the screen of the external device. Historical data is stored inside the pump in a stream and the pump can communicate with this stream to extract or act upon the same. An internal pump memory such as a disc within a chip or other internal flash stores, communicates with the pump so that session data is written to an internal history log. At the end of a session, for example, the pump will write the session data to its internal history log and the external device will ask if there is any data and if the pump indicates that there is, then the external device will download this historical data to update its non-live view screens. The external device can also make this same query after an extended time and then download multiple session data, and the query also can be made during a session. In one particular embodiment, as much as 600 sessions of data can be stored.

In one or more embodiments, the system can additionally or further include structure configured to accomplish or functionality operating as an Active Pause Mode, that allows the system to maintain latch vacuum, while remaining (especially under no/low flow) virtually silent. Such a system stays much quieter than pump mode, but ensures the system does not fall off the breast. It can be employed by the user mom when she needs to interact with others and does not want them to hear the pump, or for some other reason where she might not be ready to remove the device but does not want active pumping either.

A remote user interface on an external device can take a myriad of forms. A user profile can be created for a child and linked to a child's birthdate. Other details such as tracking the child's age when use of the system commenced can be gathered so that analytics pertinent to the child's age can be generated. In this way, pump performance can be tracked to the growth of the child. Reminders can be entered into the system so that the user can focus on matters other than breast pumping. Notifications can be keyed to time or volume of milk pumped while both of such criteria as well as battery life can be tracked and reflected on the remote computer. Easily understood and convenient graphics are contemplated for expressing status such as curved hemispherical strips 150 reflecting volumes pumped for each pump system, the same information also being shown in numerical form. Timing countdowns as well as information from one or more previous sessions can also be graphically displayed for effectively communicating with a user. The ability to remotely begin a new session can also be made available to the user.

The remote user interface, whether provided as an App, on a cell phone, computer or other computing device, can also include specific user control functionality, and various related easy to understand displays. In one or more approaches, the amount of milk pumped is tracked by day, and an option is provided to the user to set a session tracker by day. The amounts pumped are also tracked by breast. A user can set one or more of time and volume of pumping by breast for one or more pumping sessions. A volume target can be set by the user by various increments such as 0.1 ounces. This setting can be set and saved, or canceled. The user can then control whether to pump with one or both breasts, and then the system starts tracking pumped volume. As pumping progresses, easily readable curved bars reflect the amount of volume being pumped by each breast, the bars becoming thicker as more volume is pumped. The user can adjust suction levels for one or both of the pumps attached to a breast to coordinate pumping or to otherwise pump as desired. After reflecting the changes in suction level, the user can return the system to tracking volumes pumped by breast, and an indication of volume remaining to be pumped is also provided. Once the pumping target is met, such as a target volume, the user interface will indicate that the session has been completed. Thereafter, an updated set tracker is presented, with an ability to set further pumping schedules. The user can then select an option to depict a summary of pumping or a history of pumping. The data provided by the user interface can include bar graphs and numerical data showing pumping by day and by breast and session times and number of session. Additionally, circles can be sized to represent relative amounts of pumping by date, and color coated by breast.

In still yet further embodiments and approaches, the pump system can alternatively or additionally include built-in or computer or App based functionality to de-stress the user's life, empower the user to better take care of the nursing baby's health, maximize the user's mobility and freedom, and support all that is involved in becoming or being a parent. In these regards, pump system structure and functionality can include one or more of keying on pain points, physical conditions, sleep, pain relief, and post partum issues, tracking sleep, sensing and tracking baby vitals and movement, focusing on connected health with the mom as the caregiver, and/or providing education, guidance or instruction on movement and ways to carry a baby, fertility, post baby needs, health of the mom, ultrasound and fertility. The pump system can additionally include App integration with smart bottles, smart scales or the like to facilitate managing overall baby health and nutrition. App updates can additionally be provided about stimulation and letdown, and timing of pumping based upon such information, such as suggestion to begin pumping. System structure and functionality can also involve updating pumping profiles based upon baby age and needs, developing pumping functionality which enhance milk production, enhance efficiency or comfort or better mimic baby. Data can be stored in the cloud for analysis, and additional functionality can be provided to modify speeds and alternated between and among customized modes and profiles. Additional or a myriad of sizes of flanges and bag or container assemblies can be provided to the user as can nighttime pump functionality or programming including automated sessions with starts and stops.

Inventory management is further functionality that is provided as part of the structure of the pump system. In connection with the same, container assemblies can include structure that is scannable or which otherwise communicates with the inventory management system (e.g., via bar codes, RFID chips). Further, operative communication structure can be provided so that the user can transmit data with and between a baby-center platform that stores data thus facilitating an avenue for the effective management of the baby's nutrition, and links can be made to automatically communicate with milk banks and donation centers. Additionally, a caregiver data share system can be included within the functionality and structure of the pump system. Texting is added to other forms and avenues for communicating such important and useful information.

In another embodiment incorporating one or more of the above-presented or below disclosed features and functionality, there is shown an alternative approach to a breast pump system 100 in FIGS. 8A-D. With reference to FIG. 8B, the breast pump system includes a flange 102 sized and shaped to receive a breast of a user, the flange 102 configured to engage a back housing 104, and the system further includes a milk container 106 that engages and connects to a lid 108. The back housing 104 and the lid 108 are configured to connect to each other and sized and shaped to retain further internal components of the breast pump system 100. Attached and extending through the lid 108 is a diaphragm 110 that includes a central opening. When breast pump system 100 is in its assembled form (FIG. 8A), a nipple tunnel 112 of the flange 102 extends laterally through the back housing 104, diaphragm 110 and the lid 108. Moreover, the system includes gentle curved surfaces and the milk container 106 defines a natural breast shape.

Figure 8A:
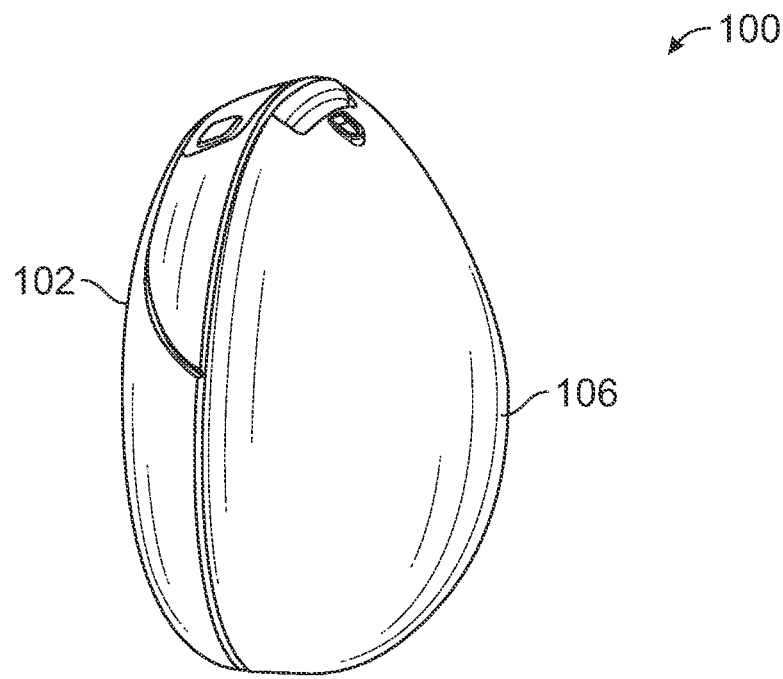
FIG. 8A is a perspective view, depicting an alternative embodiment of a breast pump system.
Figure 8B:
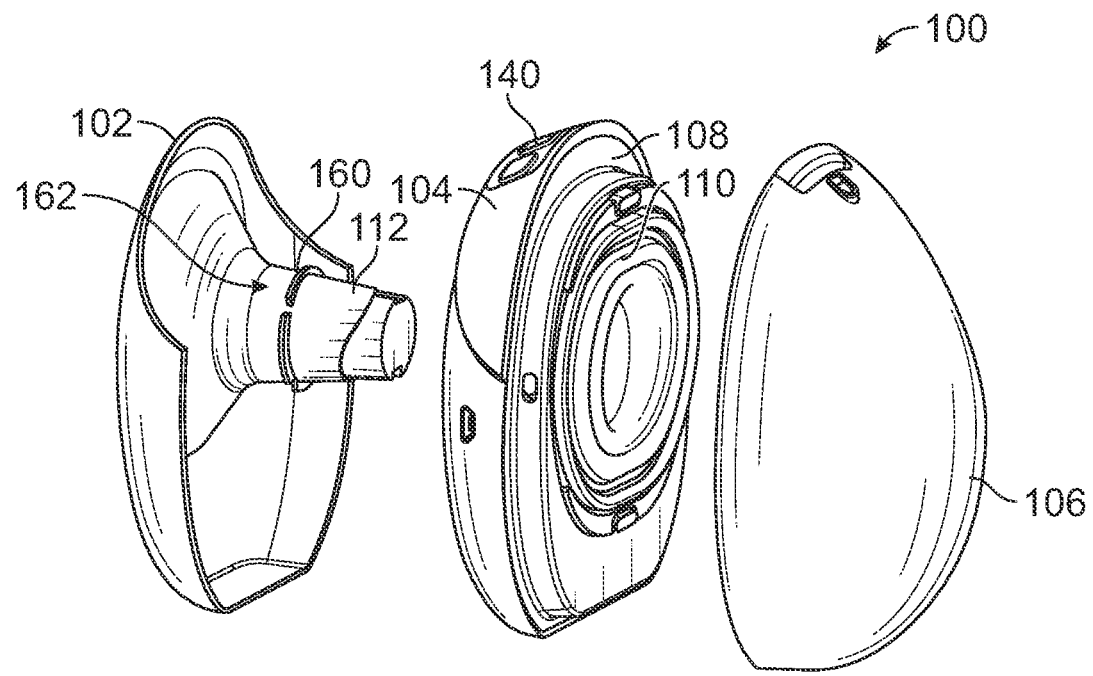
FIGS. 8B-C are exploded views, depicting the breast pump system of FIG. 8A.
Figure 8C:
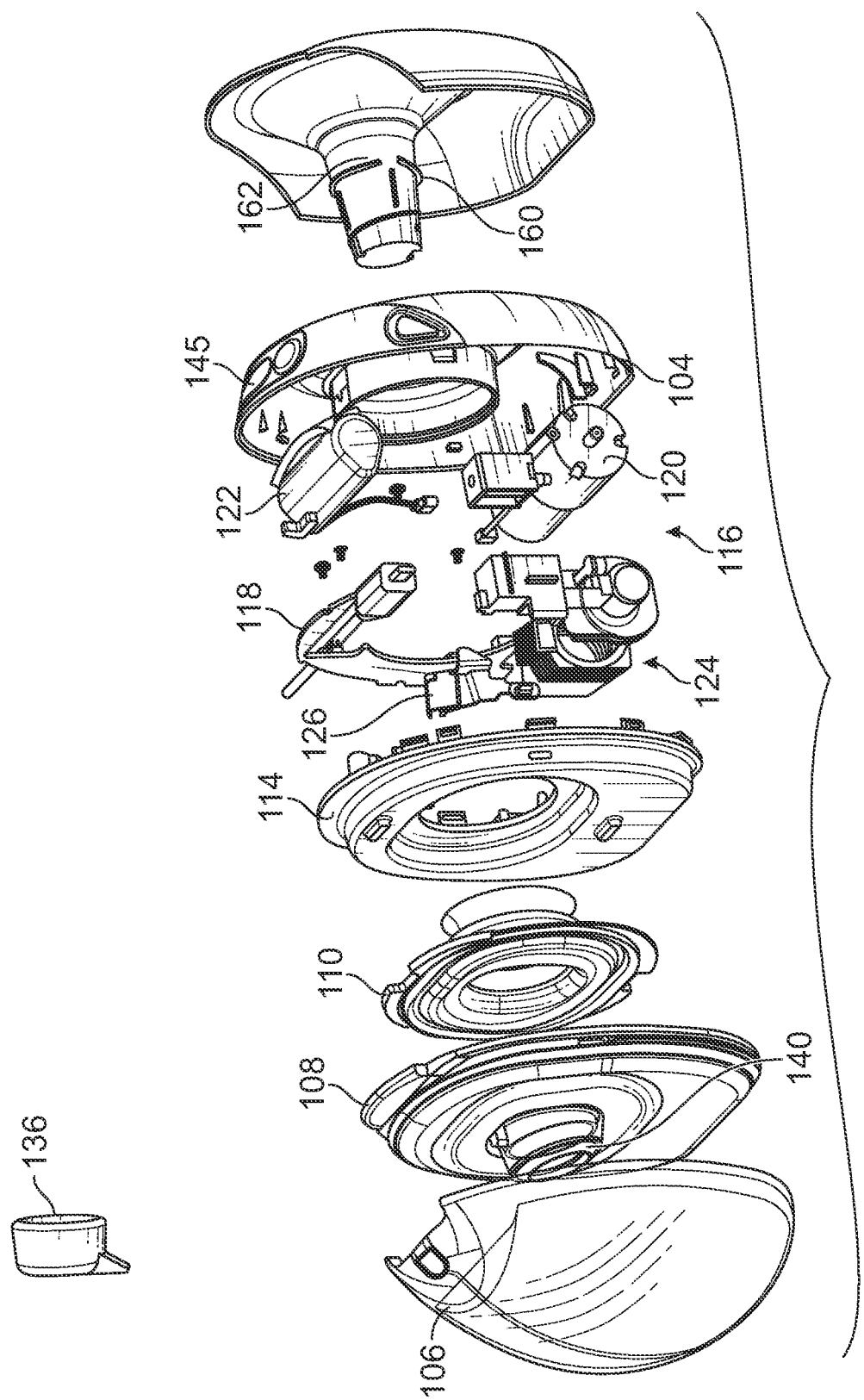

As best seen in the fully exploded view of FIG. 8C, configured and sandwiched between the back housing 104 and the lid 108 is a front housing 114 to which components of a pump assembly 116 are attached. The pump subassembly 116 includes a PCB 118, a motor assembly 120, a solenoid and a battery assembly 122. Adapted to be configured about or adjacent the motor assembly 120 is a muffler assembly 124 that includes a sleeve and muffler components that cooperate to reduce the sound generated by the operation of the pump and motor assemblies. A latch assembly 126 is further provided to assist in holding the pump subassembly 116 components in place between the back housing 104 and the lid 108.

Additionally, configured between the lid 108 and the container 106 can be a duckbill valve 136 that mates with a center hole 140 formed in the lid 108. In operation, the pump subassembly 116 functions to cause the diaphragm 110 to flex or pulsate according to a controlled pattern to thereby create desired waveforms of vacuum within the nipple tunnel 112. This action causes letdown and the flow of milk from a user's breast. The milk is transported from the nipple tunnel 112 through the duckbill valve 136 and into the milk container 106. A control panel 145 is configured on a top outside surface of the breast pump system 100 and via its communication with the pump subassembly 116 is configured to provide the user with means for controlling the operation of the pump 116. As stated, one or more of the pump features and functionality described above, including a controller providing direct or remote control and data collection, can be incorporated into the breast pump system 100 so that the needs and desired pump operation is provided to the user. Moreover, the system 100 can be configured to function to evacuate air from the container 106 before, during or after use, and the motor assembly 116 can be programmed or controlled to achieve target vacuum levels such as pulling more vacuum after levels dips to a certain degree.

Figure 8D:
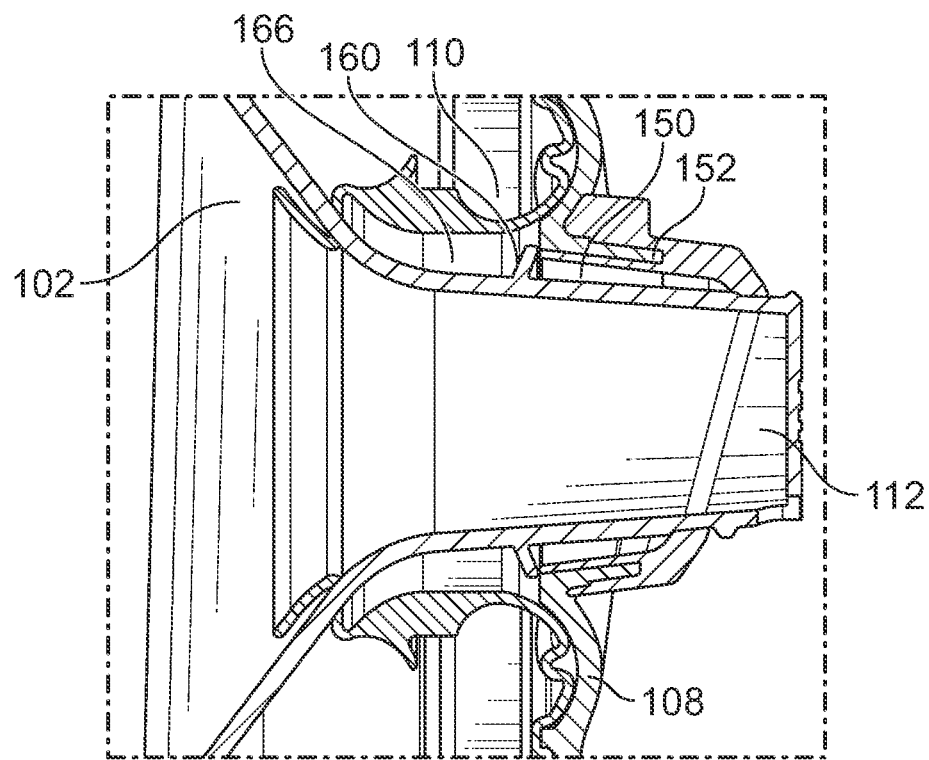
FIG. 8D is a cross-sectional view, depicting components of the breast pump system of FIG. 8A.

Notably, this approach to the breast pump system 100 includes a volume equalization and diffusing chamber 150. The volume equalization and diffusing chamber 150 one or more conditions the vacuum created by the pump so that the vacuum being applied to a breast is equally distributed within the nipple tunnel 112 or functions as a sound dampener. As best seen in FIG. 8D, the volume equalization and diffusing chamber 150 is formed by an outer surface of the nipple tunnel 112 and an inner surface of a generally tubular portion 152 extending from the lid 108. An annular angled wall 160 is formed about the outer surface of the nipple tunnel 112, the annular wall 160 including a plurality of cut-outs 162 in selected locations to provide an opening to the volume equalization and diffusing chamber 150 (See also FIG. 8C). In one embodiment, there are three such cut-outs 162 formed in the annular wall 160, but fewer or more cut-outs of varying shapes can also be utilized. As such, the pulsating or flexing action of the diaphragm 110 caused by its interaction with the pump subassembly 116 creates a desired amount and character of vacuum in a first chamber 166. The volume equalization and diffusing chamber 150 then conditions this vacuum prior to the vacuum entering the nipple tunnel 112 to create a more controlled target vacuum. Thus, the vacuum generated by the pump subassembly 116 is first applied within the first chamber 166, and this vacuum is conditioned by the volume equalization and diffusing chamber 150 so that the conditioned and controlled vacuum can be applied to breast tissue as desired and directed.

Figure 9:
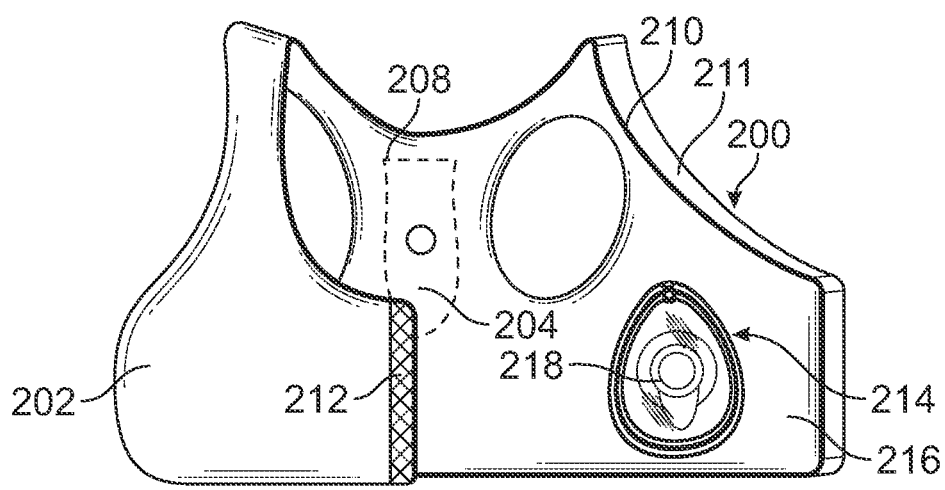
FIG. 9 is a perspective view, depicting one approach to a breast pump system incorporated into a bra.

Turning to FIG. 9, there is shown a breast pump and brassiere assembly 200 that includes a brassiere 202 and a breast pump system including a pump 204. This assembly is configured for a person who contemplates pumping while being moderately or highly active such as when exercising or otherwise being mobile. The user can wear the brassiere 202 with or without the pump 204 and/or an associated collection cup such as those described above. Here, a single pump 204 is integrated into a pocket 208 formed in a back surface of the brassiere 202 so that the pump 204 is nestled between the user's shoulder blades. Various approaches to securing the pump 204 into the pocket 208 can be employed such as a zipper or Velcro so that the pump 204 can be removed when washing the brassiere 202. In certain embodiments, the pocket 208 is also contemplated to be fluid tight so as to protect the pump 204 from sweat, for example. Tubing 210 is provided to connect the pump 204 to breast interfacing and milk collection structure such as one or more of the flanges and collection cups described above. Here, the milk collection structure employed can additionally include a cap with a hole formed therein, the hole configured to allow for venting while the user is being highly mobile. Such tubing can be routed along straps 211 of the brassiere 202 so that they can both be secured thereto and be conveniently located away from the user's skin. It is to be appreciated that tubing can extend to one or both of the cups of a brassiere that contain pump components.

The brassiere 202 can be opened and repeatably attached at its front 212 using conventional means such as clips, zippers or Velcro, and is configured to provide a tight supportive fit. One or both of the cups 214 of the brassiere 202 are formed by two layers of material with an inside layer 216 being a soft and/or mesh-like material that faces the user's breast. The material is to be stretchable to allow for the user to move and adjust alignment of the breast pump components as necessary. Additionally, the outer layer of material is to be thicker and more supportive material. The brassiere cups 214 are sized and shaped to receive a collection container and/or other breast pump components between the fabric layers. A hole 218 is provided in the inner fabric layer to provide a path for a sealed connection between a flange or other breast adapter structure and the pumping components configured between the fabric layers of the brassiere cup 214, to thereby complete the breast pump assembly. In this regard, a valve can be configured at the connection between the flange or breast adapter and the receptacle into which the flange/breast adapter is inserter to accomplish both sealing the components together and sealing closed the breast pump components configured within the fabric layers to avoid leakage. Notably, one or more of the above-presented features and functionality, including the described pressure sensing capabilities relative to controlling latch, can be embodied in the breast pump assembly that is incorporated into the breast pump and brassiere assembly 200.

Figure 10A:
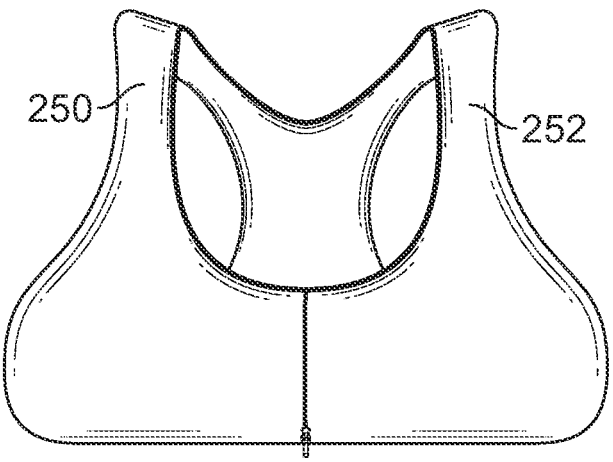
FIGS. 10A-B are front views, depicting another approach to a breast pump system incorporated into a bra.
Figure 10B:
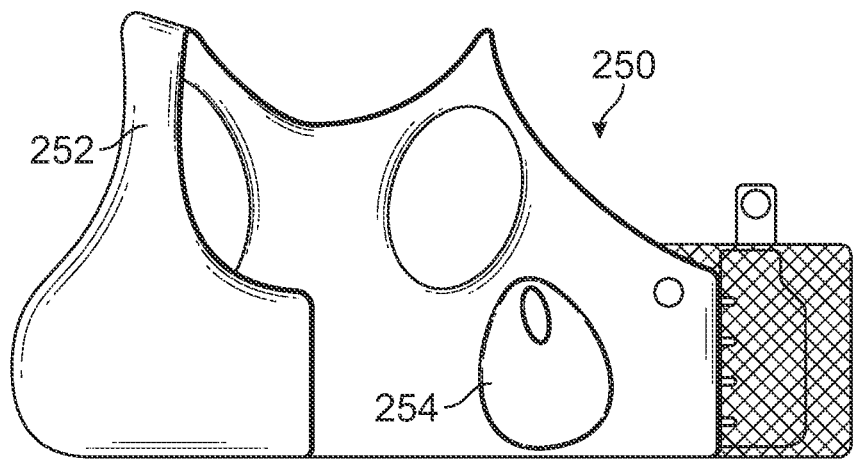

In another approach (See FIGS. 10A-B), a brassiere incorporating a breast pump can additionally or alternatively be embodied into a dual layer assembly 250. Here, the inner layer defines a tight supportive fabric configured to hold one or more of the components of the above-described breast pumps securely against a breast during vigorous or other activity. The brassiere 252 hooks or zips closed in the front or back (shown connecting in the front in FIGS. 10A-B). The second outer layer is formed from a flexible material that can easily expand to thereby define a pocket 254 between first and second layers that is sized and shaped to contain a milk container. Thus, with this approach, since the milk container is retained in the pocket 254, the remaining components of the breast pump including the outer skin can be made to assume a lower profile. Notably, the milk container can be any one of the containers described herein including a bag or soft bladder approach or more rigid container designs. Additionally, the brassiere is contemplated to be compatible with one or more of the components of the herein disclosed breast pump system embodiments. Moreover, it is to be understood that the flange or other breast adapter structure can have less depth or volume since space within or attached to the pump is not required to accommodate for the milk container and thus the flange or breast adapter need not extend across such a space.

Figure 11A:
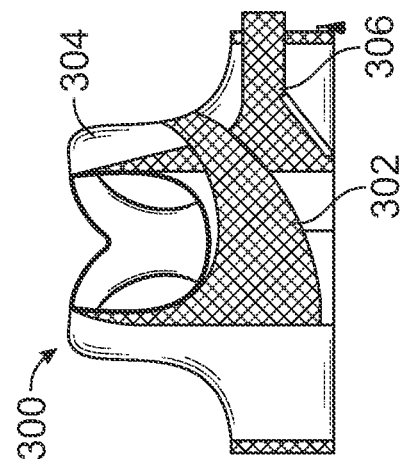
FIGS. 11A-C are front views, depicting yet another approach to a breast pump system incorporated into a bra.
Figure 11B:
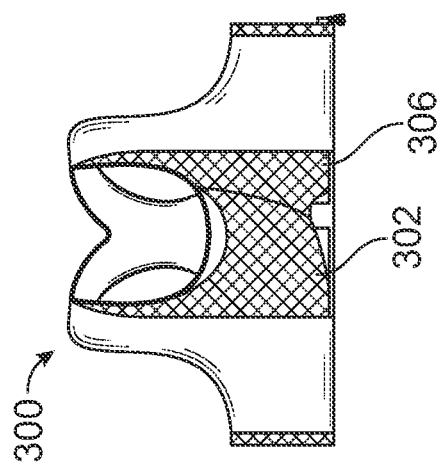
Figure 11C:
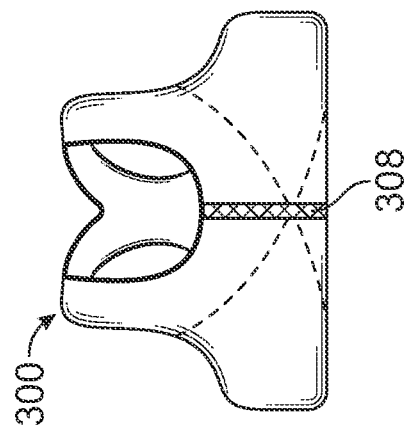
Figure 12A:
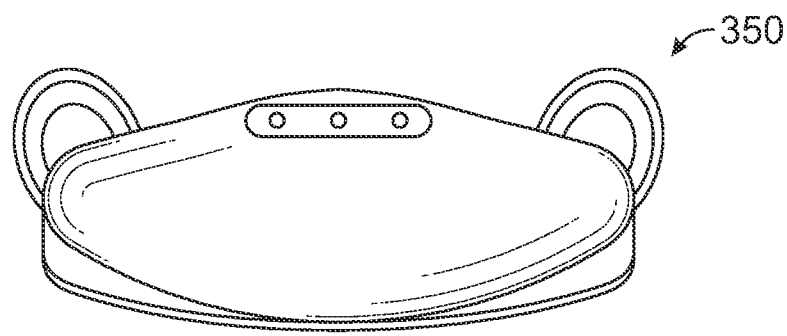
FIG. 12A is a front view, depicting a breast pump system including a pair of breast receiving assemblies.
Figure 12B:
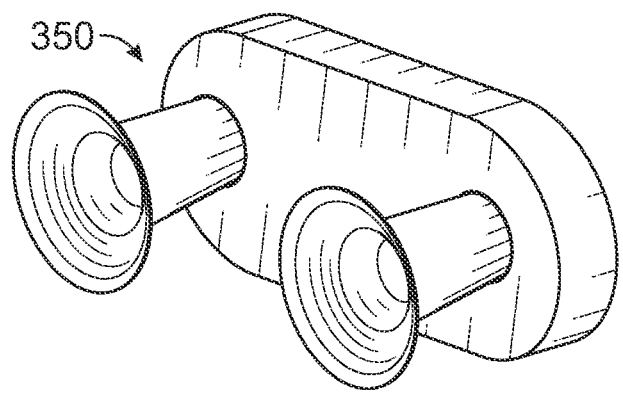
FIG. 12B is a perspective view, depicting the breast pump system of FIG. 12A.
Figure 12C:
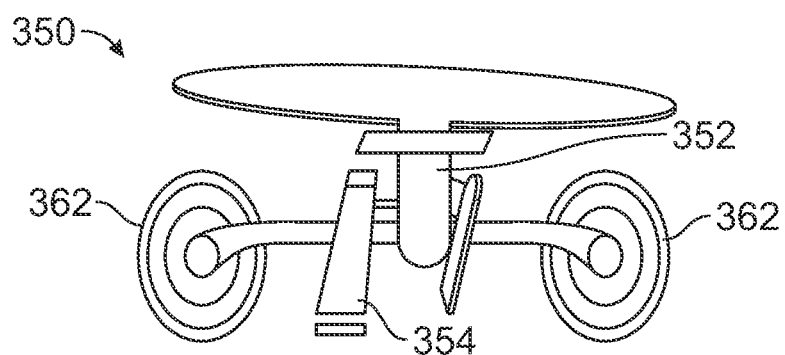
FIG. 12C is a top view, depicting the breast pump system of FIG. 12A.
Figure 12D:
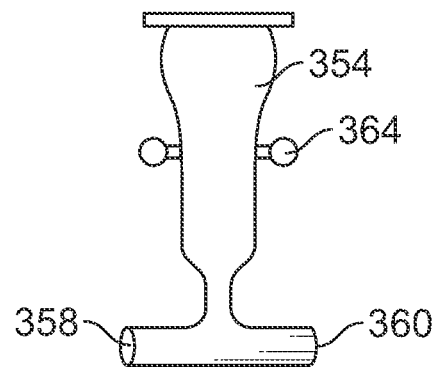
FIG. 12D is a front view, depicting a flex conduit component of the system of FIG. 12A.

As shown in FIGS. 11A-C, in a related approach to a breast pump and brassiere assembly 300, the assembly can additionally or alternatively include an inner mesh liner 302 that can be configured to house breast pump components. The inner mesh liner 302 can also be secured to an opposite should strap 304 while still allowing access to the other breast (FIG. 12A). Similarly, the second inner liner 306 can be secured to an opposite strap (FIG. 12B) to provide access to the second breast. Further, as with the other related embodiments, the outer layer can be zipped or otherwise attached to each other in the front 308 of the brassiere.

With reference now to FIGS. 12A-F, there is shown a dual breast pump system 350. The dual breast pump system 350 can embody one or more of the above-described features and functionality and further includes a single pump 352 and a single flex conduit 354. The flex conduit 354 includes (FIG. 12D) a first tubular connector 358 and a second tubular connector 360, the first and second tubular connectors 358, 360 each individually being operatively associated with or connected to a flange or breast adapter 362. The assembly thus includes a pair of flanges 362 each connected to a base or body of the assembly and a control panel incorporated into the base for controlling the operation of the assembly. The flex conduit 354 further includes ball connectors 364 adapted to connect to the pump 352, the flex conduit 354 and pump 352 cooperating to cause the flex tube to expand and contract to thereby create a vacuum within the pump system 350. This vacuum is applied to a breast through the flanges 362. In order to collect the milk that is pumped, a milk container is sealingly attached to the flanges 362.

Figure 12E:
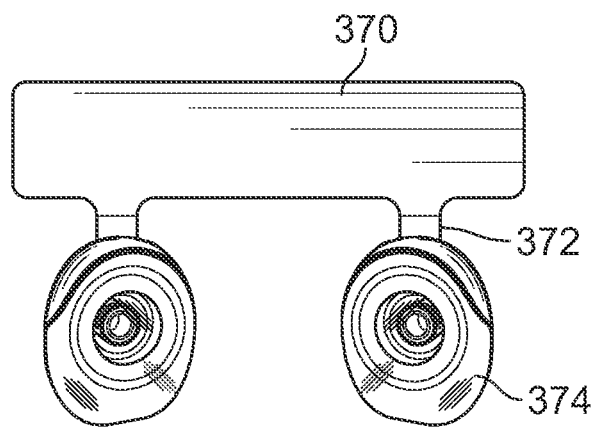
FIGS. 12E-F are front views, depicting approaches to container assemblies for the system of FIG. 12A.
Figure 12F:
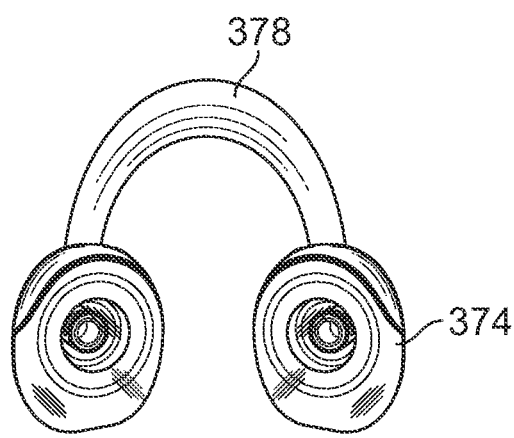

As shown schematically in FIGS. 12E-F, a single container can be attached to both flanges of a dual breast pump system. In one approach (FIG. 12E), the container 370 defines a generally rectangular profile and includes two extensions or connectors 372, each adapted to connect to one breast flange or pump 374. In a second approach (FIG. 12F), the milk container resembles a tube 378, opposite ends of which are adapted to include connectors for connecting to a single pump 374. In each of these approaches, a one-way valve can be employed as a connector between the pump structure and the milk container.

Figure 13A:
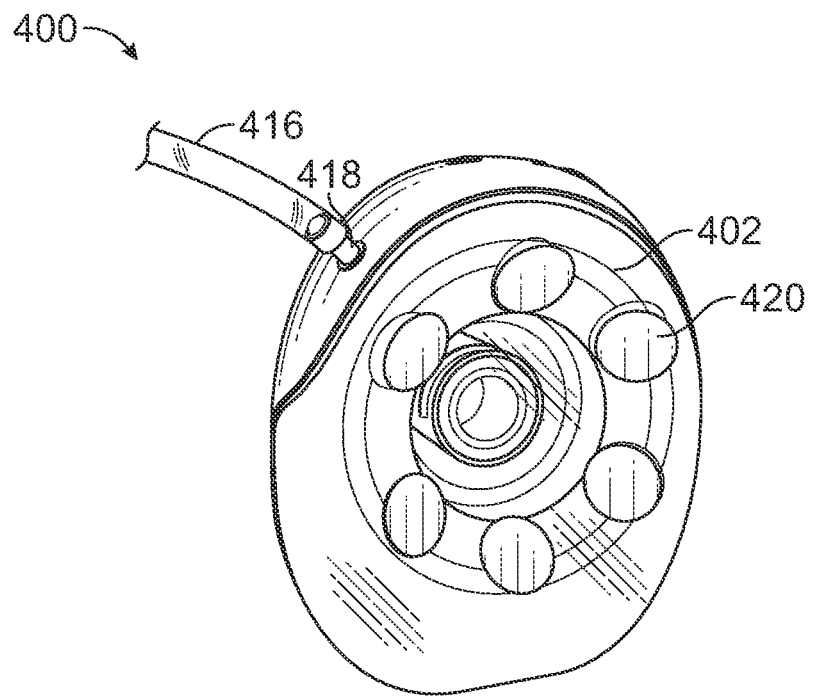
FIGS. 13A-B are perspective views, depicting yet another approach to a breast pump system.
Figure 13B:
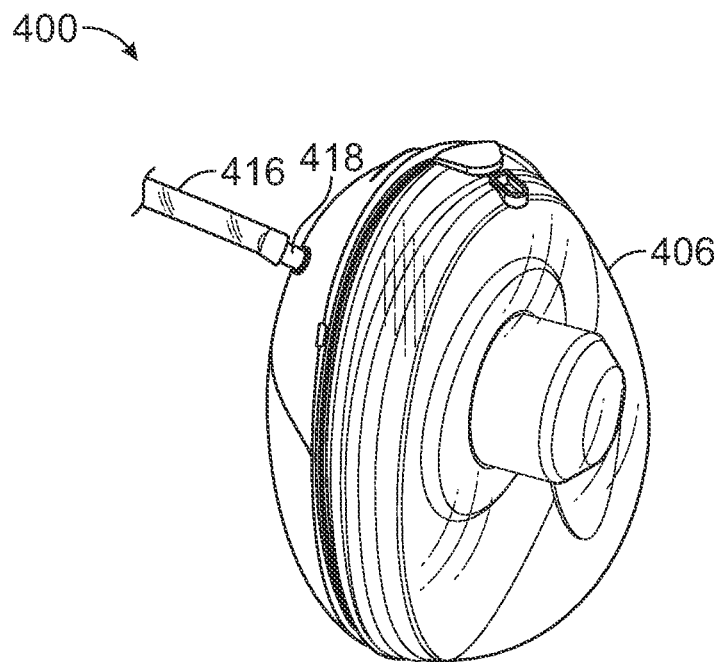
Figure 13C:
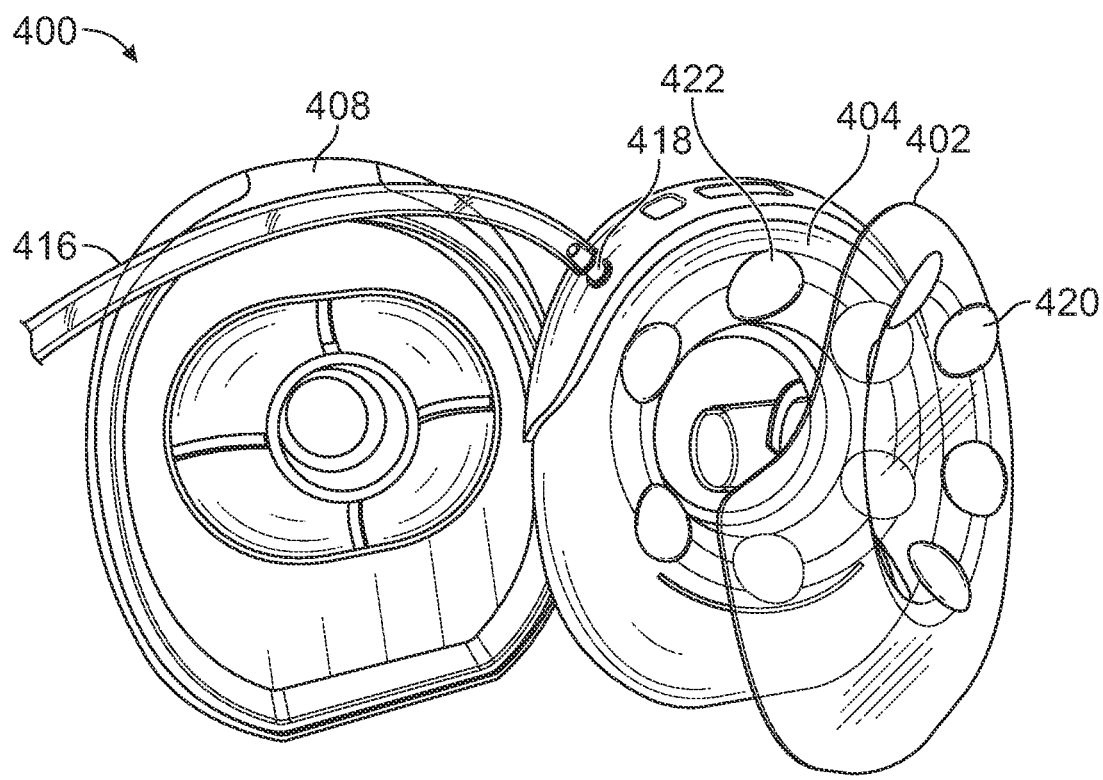
FIG. 13C is an exploded view, depicting the breast pump system of FIG. 13A.

With reference to FIGS. 13A-C, there is shown yet another embodiment of components of a breast pump system 400. This approach includes a number of the components common to above-described breast pump system embodiments including a flange 402 and a back housing 404 as well as a milk container 406 and a lid 408. Likewise, this system 400 can embody one or more of the features and functionality described in connection with other disclosed approaches. In this approach, similar to the embodiments of one or more of the systems contemplated for the breast pump and brassiere assemblies, the pump components (not shown) are connected to the flange and milk container assembly via a tube 416, the tube 416 being configured to deliver a vacuum generated and controlled via the pump components to the flange and milk container assembly. A fitting 418 is provided to connect the tube 416 to the back housing 404. The fitting 418 can assume various configurations including a connection that is flush with an outer surface of the assembly. Moreover, in this approach, various pumps can be attached to provide vacuum pressures desired to accomplish pumping of milk from a breast and since the flange and milk container assembly still fits within a bra, discretion and privacy is maintained.

This breast pump system 400 or any of the disclosed systems can further include heating and/or vibration elements configured to transfer such energy directly to a breast or through the flange 402 to thereby facilitate the expression of milk from a breast. Consequently, in one aspect the assembly can further or alternatively house a vibrational motor (not shown). Other forms of energy can also alternatively or additionally be applied to the breast, such as ultrasound. In one approach, energy conducting elements 420 are attached to an outer surface of the back housing 404. Matching energy conducting elements 422 are likewise configured on the flange 402 in an area designed to apply energy to breast tissue and to align with and communicate with the elements 420 positioned on the back housing 404 when the components are assembled. The energy conducting elements 422 can be configured to directly engage breast tissue or a thin layer of a polymer can both provide a barrier between the elements 422 and breast tissue and ensure a smooth flange surface. It is to be recognized that the elements 420, 422 shown in the figures are just one approach to such elements and that smaller, fewer or more or various patterns of elements 420, 422 can be employed to achieve desired effects upon a breast. The application of the selected energy though the elements can be controlled by the user or automatically by the system, and can be further controlled to apply different levels of energies to different regions of the breast. Control of the application of such energies can be via buttons or an app so that the same can be utilized and/or customized as the need arises. Sensors of various types can also be similarly arranged to assess breast function or fullness or to assess whether the flange is engaging breast tissue before, during or after actuating heat.

Further, as with previously described systems, this system 400 can be configured to function to evacuate air from the container 406 before, during or after use, and the system 400 can be programmed or controlled to achieve target vacuum levels such as pulling more vacuum after levels dip to a certain degree. Thus, the system 400 can be turned on to evacuate air out of the container and continue to pull to generate a vacuum inside the container. In this way, the user's nipple is therefore latched to the flange 402 which also facilitates providing the user with spill-proof mobility. During operation, vacuum within the system 400 will progressively drop as the user expresses milk into the container 406. Therefore, the system 400 is provided with functionality to detect the vacuum level inside the container 406 using a sensor (not shown) such as the non-contact sensor presented above or alternatively a pressure sensor integrated into other portions of the pump associated with the system 400, such as by measuring the pressure within the tube 416. Therefore, the system 400 is configured to pull increased vacuums as needed. Where the system 400 is configured as an open system to the container 416, the container 416 can also feature a cap or adapter that connects to the pump tubing 416 that also offers a tortuous path to prevent fluid from getting pulled into the pump.

Figure 14A:
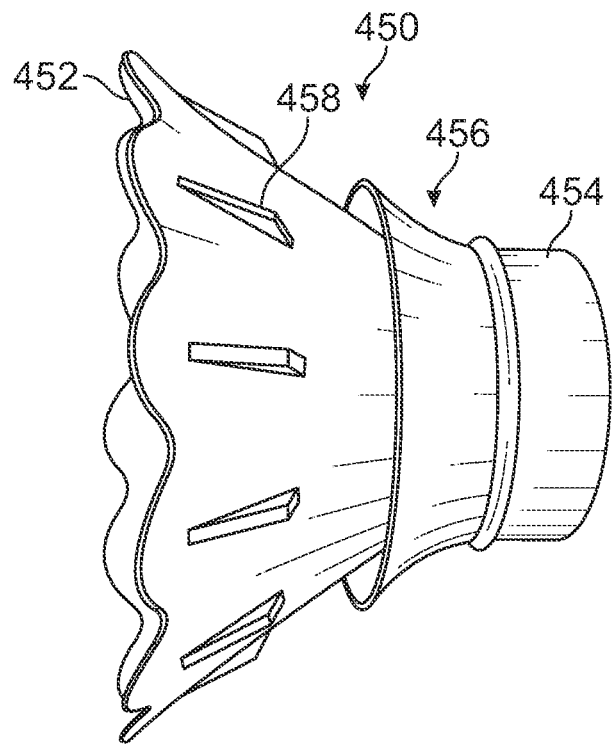
FIG. 14A is a side view, depicting a flange insert.
Figure 14B:
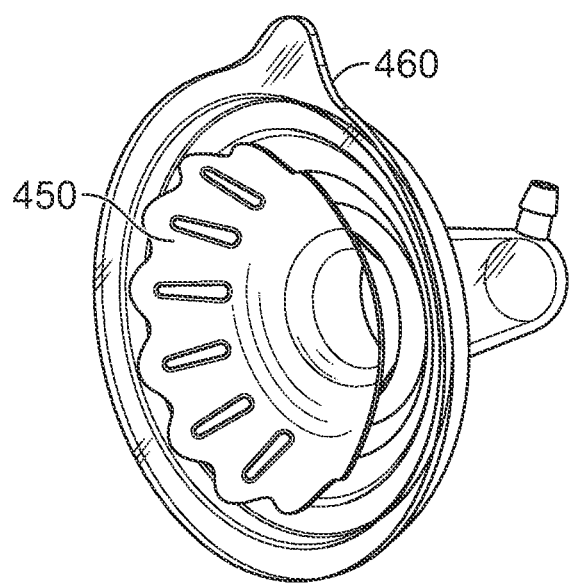
FIG. 14B is perspective view, depicting the flange insert of FIG. 14A placed within a flange.
Figure 14C:
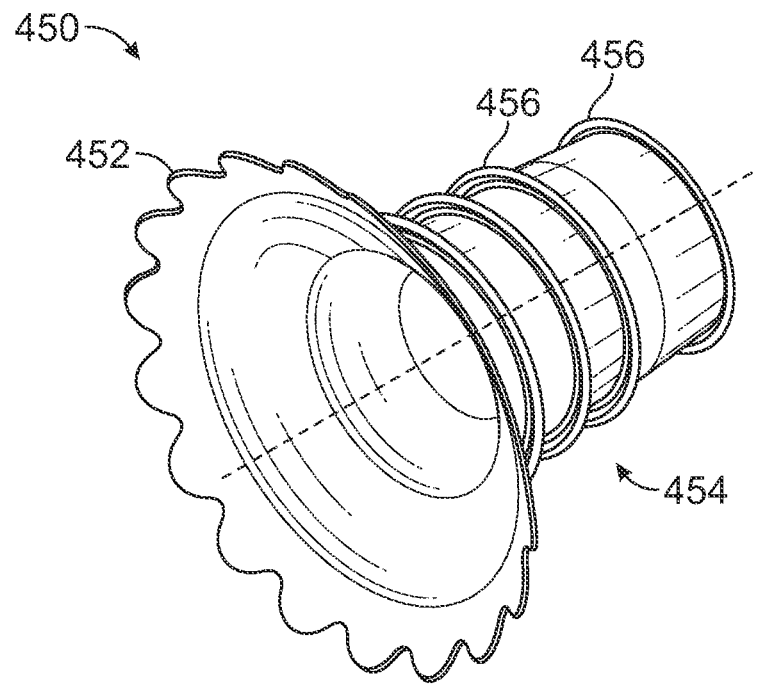
FIGS. 14C-D are perspective views, depicting an alternative approach to a flange insert.
Figure 14D:
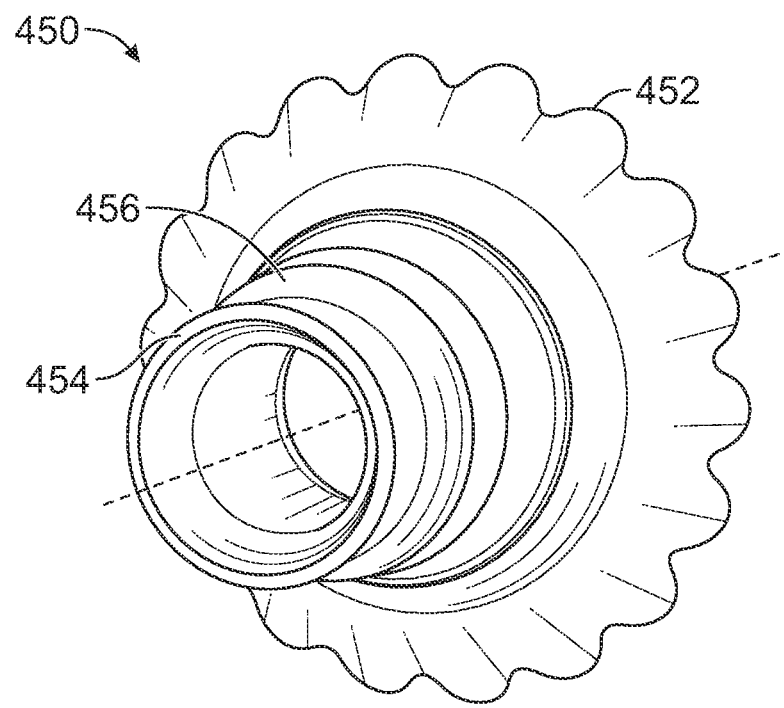

Turning to FIGS. 14A-D, there is shown a flower-like insert 450. As shown in FIGS. 14A-B, the flower-like insert 450 presents a structure offering sizing to facilitate mating of a breast with components of a breast pump system, as well as for comfort. Notably, the petal pattern 452 on an outside perimeter of the component is sized and shaped to receive a breast and provides both comfort and ease of removal as well as functions as suction cup structure against the user's breast. The insert 450 defines a generally cone profile or funnel-like body including a tube 454, and includes one or more annular sealing and/or mating or blade gasket structures 456 projecting from a tubular portion of the funnel-like body for engaging with an interior of a flange 460 or other complementary structure. These structures 456 are configured and function to facilitate more repeatable and reliable vacuum levels being applied to a breast and assures proper volume accuracy. Configured along an exterior of the funnel portion are a plurality of ridges 458 which are sized and shaped to engage with an interior of the flange 460, an interior of the insert providing suction of the insert 450 to the breast. The ridges also operate to increase comfort and a massage-like effect during pumping. Various sizes of the insert 450 can be provided as part of a kit. The insert also facilitates latch to a breast which in turn allows for greater access to the breast tissue for hand massaging milk ducts, as well as general mobility with leaking milk. In use, the insert 450 is securely and replaceably configured within the flange 460 of a breast pump system. Moreover, the insert 450 is formed from material that facilitates and is independently designed to seal with a breast so that the user can maintain suction thereto and readjust the breast and insert 450 relative to a flange 460 as needed. In one approach, the insert is formed from a relatively soft and flexible material such as silicone. When desired relative positioning is achieved the insert 450 can be sealingly engaged with the flange 460. The insert 450 thus provides the user with enhanced comfort, fit and adjustability.

In another embodiment (FIGS. 14C-D), the flower-like insert 450 includes an alternative pattern of pedals 452 as well as a longer tube portion 454 configured with alternative approaches to annular sealing or gasket structures 456. An additional sealing or gasket structure 454 can be configured at a terminal end of the tube portion 454 for mating purposes with receiving structure. Various other approaches to the insert 450 are also contemplated such as structures including longer or shorter tube portions with various other alternative approaches to sealing or gasket structures, each of which are contemplated to be replaceably received within a flange for the purpose of providing comfort and offering sizing to facilitate mating of a breast with components of a breast pump system. Moreover, the funnel-like body of the disclosed inserts 450 can also varying to define larger or more narrow angles, or irregular shapes for receiving various sized breasts.

Figure 15A:
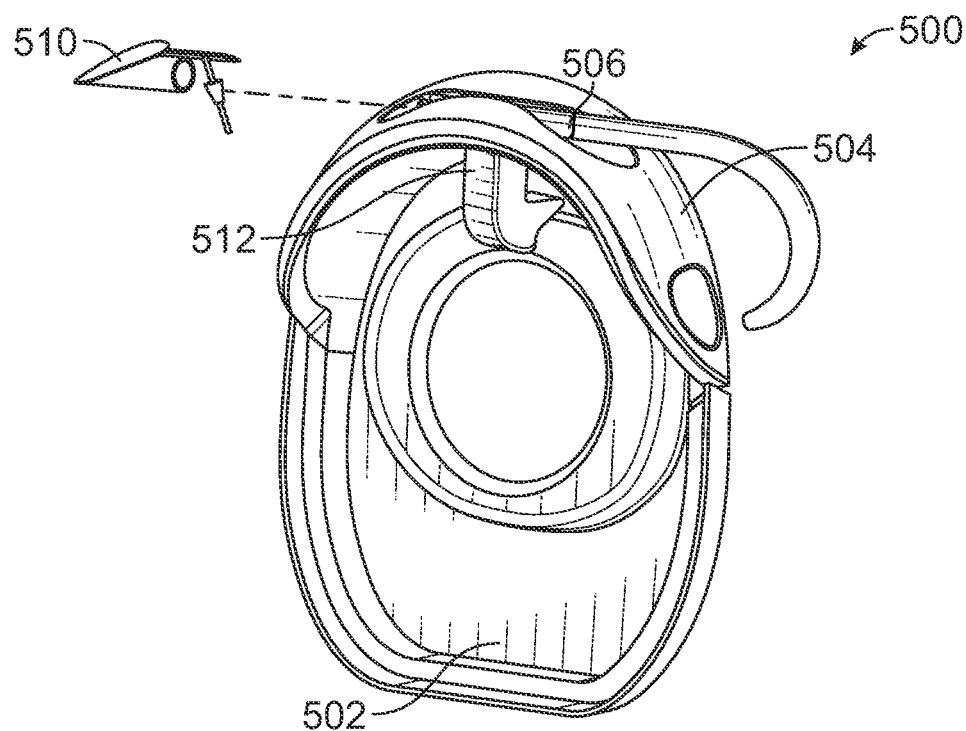
FIG. 15A is a perspective view, depicting a breast pump adapter assembly.
Figure 15B:
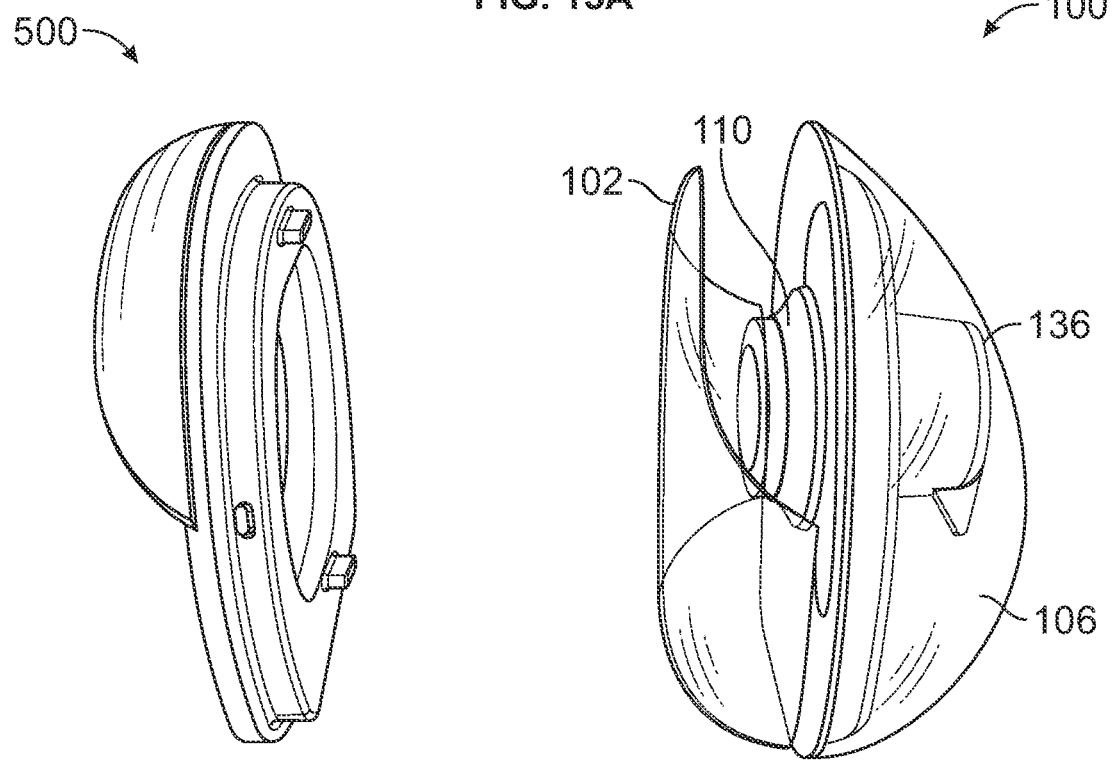
FIG. 15B is a side view, depicting the breast pump adapter assembly of FIG. 15A next to a breast pump assembly without a pump subassembly.
Figure 15C:
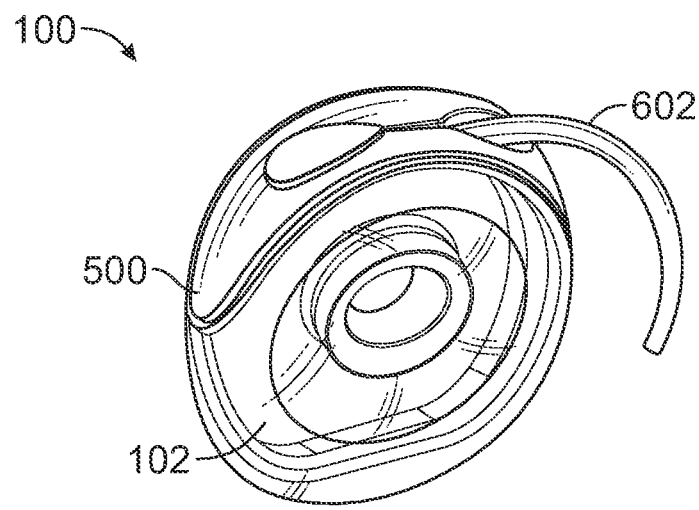
FIG. 15C-D are perspective views, depicting a breast pump adapter assembly assembled to a breast pump assembly.
Figure 15D:
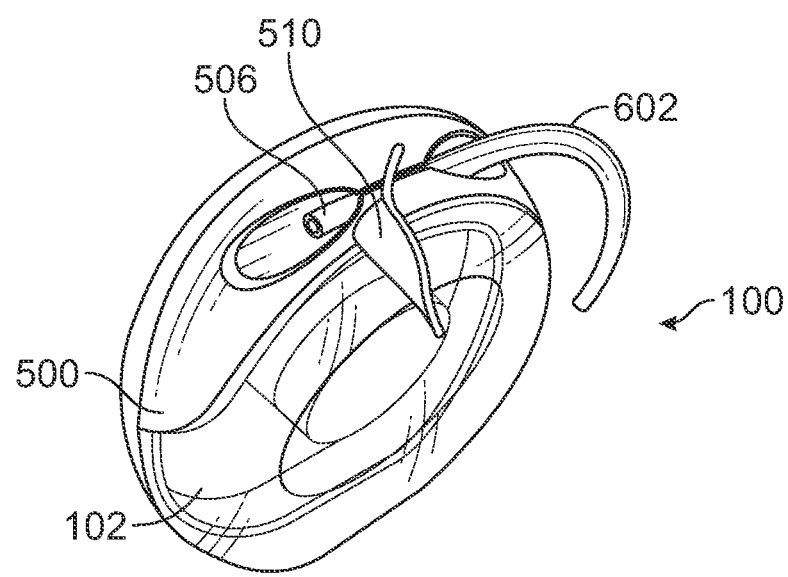
Figure 15E:
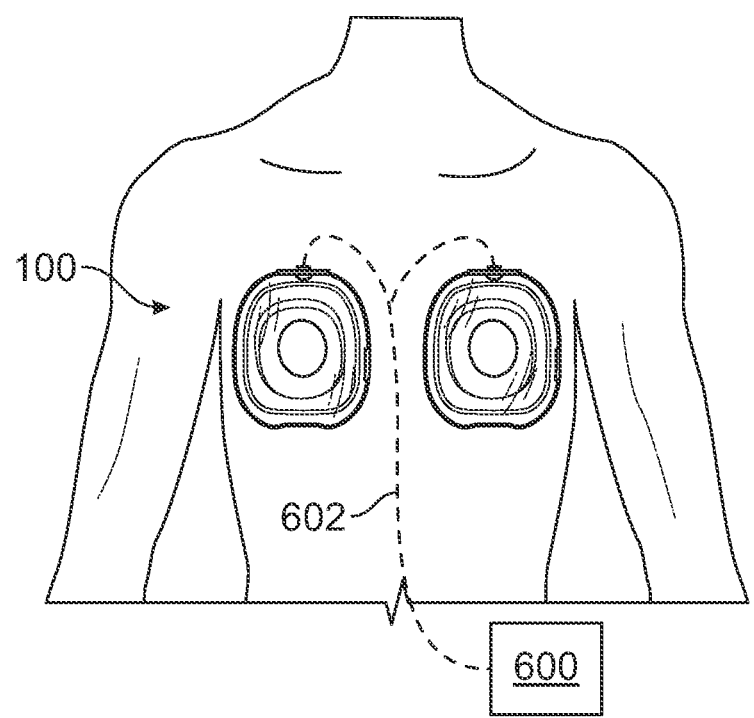
FIG. 15E is front view, depicting the breast pump adapter and pump assemblies in use.

With reference to FIGS. 15A-E, there is shown a breast pump adapter assembly 500 that can be configured for use with a breast pump assembly 100 with the pump assembly 116, front housing 114 and back housing 104 removed. With this approach, a user is provided with the ability to collect milk within a bra by connecting a conventional pump 600 to the breast pump adapter 500 assembly and use the same milk path as provided by the breast pump assembly 100 (See FIGS. 8A-C). FIG. 15B shows the breast pump adapter assembly 500 ready for attachment to the breast pump assembly 100. Thus, the convention pump 600 provides the vacuum that is generated through the assembly and applied to the breast through the flange 102. In this way, the user is given the added discretion and ability to upgrade to a fully mobile breast pump system when desired.

The breast pump adapter assembly 500 and breast pump subassembly without the pump assembly 116 cooperate to define a milk path involving each of the flange 102, diaphragm 110, duckbill valve 136, milk container 106 and lid 108 (See FIGS. 8A-C). In one embodiment, the breast pump adapter assembly 500 includes a base 502 attached to a headband assembly 504. The headband assembly 504 attaches to a top curved portion of the base 502 and extends generally perpendicular to the base 502 along the curved upper portion of the base 502. The headband assembly 504 and base 502 are shaped to mate with complementary structure of the flange 102 and the headband 504 includes two barb connectors 506 that sealingly connect to conventional pump tubing 602. Since the breast pump adapter assembly 500 and breast pump assembly 100 can be used on each breast, a plug assembly 510 is provided to attach to the barb connector 506 that is not in use. An elbow 512 is further provided and configured to support the headband 104. When the breast pump adapter assembly 500 is attached to the pump 100, vacuum is applied through the pump tubing 602 to the diaphragm 100 to create suction through the milk path to the breast. In operation, the conventional pump 600 functions to cause the diaphragm 110 to flex or pulsate according to a controlled pattern to thereby create desired waveforms of vacuum within the flange 102. This action causes letdown and the flow of milk from a user's breast. The milk is transported from the flange 102 through the duckbill valve 136 and into the milk container 106.

While the present disclosure has been described with reference to the specific embodiments thereof, it should be understood by those skilled in the art that various changes may be made and equivalents may be substituted without departing from the true spirit and scope of the disclosure. In addition, many modifications may be made to adapt a particular situation, material, composition of matter, process, process step or steps, to the objective, spirit and scope of the present disclosure. All such modifications are intended to be within the scope of the present disclosure.

That which is claimed is:

1. A wearable system to pump fluid from a breast, the system comprising:
   a flange configured and dimensioned to form a seal with the breast, the flange including a nipple tunnel, the nipple tunnel including an annular angled wall that circumscribes and protrudes from an outer surface of the nipple tunnel;
   a lid sized and shaped to receive the flange;
   a diaphragm including an opening, the nipple tunnel configured to extend through the opening in the diaphragm;
   a first chamber, the first chamber defined by the lid and the diaphragm;
   a pump assembly configured to flex the diaphragm;
   a volume equalization and diffusing chamber configured to be in fluid communication with the first chamber, the volume equalization and diffusing chamber defined by the lid and the flange, the volume equalization and diffusing chamber is on a same side of the diaphragm as the first chamber, the annular angled wall including a plurality of cut-outs to provide a path to the volume equalization and diffusing chamber from the first chamber; and
   a milk collection container assembly configured to receive pumped milk, the milk collection container assembly defining an entirety of a breast shape profile;
   wherein the diaphragm functions to create a vacuum within the first chamber and the volume equalization and diffusing chamber conditions the vacuum created within the first chamber, wherein the volume equalization and diffusing chamber is in fluid communication with an interior of the nipple tunnel and the vacuum is applied to the interior of the nipple tunnel from the volume equalization and diffusing chamber.

2. The wearable system to pump fluid from a breast of claim 1, wherein the volume equalization and diffusing chamber functions to one or more of dampen sound or equalize a distribution of the vacuum within the nipple tunnel.

3. The wearable system to pump fluid from a breast of claim 1, further comprising a controller that controls vacuum levels within the system.

4. The wearable system to pump fluid from a breast of claim 1, wherein an external surface of the nipple tunnel includes an annular ring.

5. The wearable system to pump fluid from a breast of claim 4, wherein the annular ring includes one or more cut-outs formed therein.

6. The wearable system to pump fluid from a breast of claim 1, wherein the diaphragm surrounds the nipple tunnel.

* * * * *